(12) United States Patent
Wasserman et al.

(10) Patent No.: US 9,352,722 B2
(45) Date of Patent: May 31, 2016

(54) DEVICE AND METHOD FOR CONTROLLING A VOLUME FLOW OF A STORED PRESSURIZED MEDIUM FOR THE PURPOSE OF ACTIVATING AN IMPACT PROTECTION DEVICE AS WELL AS A DEVICE FOR ACTIVATING AN IMPACT PROTECTION DEVICE

(71) Applicants: Robert Bosch GmbH, Stuttgart (DE); Monika Nitschke, Asperg (DE)

(72) Inventors: Peter Wasserman, Weil der Stadt (DE); Werner Nitschke, Asperg (DE); Elmar Vier, Freiberg A. N. (DE); Raed Hamada, Stuttgart (DE); Horst Beling, Heilbronn (DE); Uwe Iben, Gerlingen (DE); Guenther Hohl, Stuttgart (DE); Stefan Woerz, Vaihingen/Enz (DE); Rudolf Heinz, Renningen (DE); Dirk Wolf, Renningen (DE); Martin Klein, Lauffen am Neckar (DE); Heiko Druckenmueller, Mundelsheim (DE); Klaus Heyer, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/607,277

(22) Filed: Jan. 28, 2015

(65) Prior Publication Data
US 2015/0210243 A1    Jul. 30, 2015

(30) Foreign Application Priority Data

Jan. 28, 2014 (DE) .......................... 10 2014 201 520
Jan. 21, 2015 (DE) .......................... 10 2015 200 900

(51) Int. Cl.
*B60R 21/261* (2011.01)
*B60R 21/264* (2006.01)
(Continued)

(52) U.S. Cl.
CPC ............. *B60R 21/261* (2013.01); *B60R 21/264* (2013.01); *B60R 21/268* (2013.01); *F16K 3/24* (2013.01); *F16K 31/122* (2013.01)

(58) Field of Classification Search
CPC .................. B60R 2021/26094; B60R 21/261; B60R 21/268; B60R 21/264; F16K 3/24; F16K 31/122
USPC .......................................... 280/737, 735, 736
See application file for complete search history.

(56) References Cited

U.S. PATENT DOCUMENTS 4,482,127 A * 11/1984 Hafele ................ F16K 31/1221
                                                        251/25
5,820,162 A * 10/1998 Fink ...................... B60R 21/205
                                                       137/68.13

(Continued)

FOREIGN PATENT DOCUMENTS

DE        202006006965        12/2006

*Primary Examiner* — Paul N Dickson
*Assistant Examiner* — Darlene P Condra
(74) *Attorney, Agent, or Firm* — Norton Rose Fulbright US LLP

(57) ABSTRACT

An activation device for a protection device includes: a body with a chamber that has, respectively at first and second ends, a medium inlet opening to a medium storage and a valve opening, and an outlet opening for discharging the medium into the protection device between the first and second ends; a valve for opening and closing the valve opening for passage of the medium; and a piston that (a) includes a passage along a main extension axis, from a first surface thereof adjacent to the medium inlet opening, to a second surface thereof, larger than the first surface and adjacent to the valve opening, and (b) is movable in the chamber by the medium and as a function of the control valve position between a position in which the at least one outlet opening is closed and a position in which the at least one outlet opening is opened.

21 Claims, 18 Drawing Sheets

(51) Int. Cl.
*F16K 3/24* (2006.01)
*F16K 31/122* (2006.01)
*B60R 21/268* (2011.01)

(56) References Cited

U.S. PATENT DOCUMENTS

| | | | |
|---|---|---|---|
| 5,904,335 A * | 5/1999 | Oyama | B60T 8/3665 137/614.11 |
| 6,062,598 A * | 5/2000 | Faigle | B60R 21/26 280/736 |
| 6,176,518 B1 * | 1/2001 | Faigle | B60R 21/26 280/736 |
| 6,220,272 B1 * | 4/2001 | Tavor | F16K 1/12 137/219 |
| 7,455,279 B2 * | 11/2008 | Weingarten | F16K 31/1268 251/331 |
| 2004/0169359 A1 * | 9/2004 | Isakov | B60R 21/26 280/736 |
| 2012/0074343 A1 * | 3/2012 | Meintjes | F16K 3/24 251/318 |
| 2012/0111433 A1 * | 5/2012 | Loeffler | F24D 19/1015 137/597 |
| 2012/0138836 A1 * | 6/2012 | Kanai | F16K 1/123 251/331 |
| 2013/0082200 A1 * | 4/2013 | Ward | B60T 8/3665 251/129.15 |

* cited by examiner

DEVICE AND METHOD FOR CONTROLLING A VOLUME FLOW OF A STORED PRESSURIZED MEDIUM FOR THE PURPOSE OF ACTIVATING AN IMPACT PROTECTION DEVICE AS WELL AS A DEVICE FOR ACTIVATING AN IMPACT PROTECTION DEVICE

FIELD OF THE INVENTION

The present invention relates to a device for controlling a volume flow of a stored pressurized medium for the purpose of activating an impact protection device, to a device for activating an impact protection device, and to a method for controlling a volume flow of a stored pressurized medium for the purpose of activating an impact protection device, in particular to be used in occupant protection devices of vehicles.

BACKGROUND

A volume flow for filling an airbag of a vehicle is usually generated with the aid of a hot gas generator or with the aid of a pyrotechnical inflator, with the aid of a cold gas storage or a hybrid gas generator. A hot gas generator, for example, includes squibs, which, in the event of an accident, receive a signal for spark ignition from a control unit. As a result of the combustion of the squibs, hot gases are formed which directly fill an airbag. In the case of a cold gas storage, gas is stored in a pressure vessel and is tightly closed with the aid of a bursting disk. In the event of an accident, the bursting disk is externally destroyed. The gas which is stored under a very high pressure subsequently enters the airbag. In a hybrid gas generator, the gas generation with the aid of pyrotechnics as in the hot gas generator is combined with the gas supply with the aid of a cold gas generator. In this context there exists a variant in which the gas is mixed with the cold gas of the cold gas generator in order to cool the hot gas in the pyrotechnic generation. This makes it possible to dispense with complicated measures for cooling the otherwise hot gas. Another variant in airbag systems having multi-stage hybrid gas generators includes one stage of the gas generator supplying gas with the aid of pyrotechnic means, and a further stage of the gas generator supplying gas with stored gas, i.e., in the form of cold gas. It is unimportant here whether the hot gas or the cold gas acts as first stage.

DE 20 2006 006 965 U1 provides a pressure accumulator, valve and distribution unit as a portable or fixedly installable device for an urgent (abrupt) and recoilless release of larger amounts of compressed air or gas stored under pressure for various technical applications.

SUMMARY

Against this background, example embodiments of the present invention provide an improved device for controlling a volume flow of a medium for the purpose of activating an impact protection device, an improved device for activating an impact protection device, and an improved method for controlling a volume flow of a stored pressurized medium for the purpose of activating an impact protection device.

In the case at hand, the medium for activating an impact protection device can be obtained from squibs (hot gas generators) as hot gas, or be provided as stored pressurized medium (cold gas generator) as cold gas, or it can be provided by a hybrid gas generator as a mixture of hot gas and cold gas.

The impact protection device can be an airbag in this context.

According to example embodiments of the present invention, a volume flow of the medium with which the impact protection device is supposed to be filled, can be advantageously formed and controlled on a case by case basis. Such a volume flow formation can be obtained, for example, in a cold gas generator, a hot gas generator, or a hybrid gas generator for an airbag with the aid of a control device or a control module in which, in particular, a control piston can be moved back and forth in a defined manner by the medium and with the aid of a control valve and advantageously situated openings. Such a volume flow formation is characterized by the option of repeatably blocking, discontinuing, and opening a high gas volume flow in particular for filling an airbag air cushion in vehicles.

Example embodiments of the present invention advantageously make it possible that targeted forms of volume flow can be implemented, in particular, as a function of the weight of a person to be protected by the impact protection device. It is also possible to open and close the media supply to the impact protection device several times in order to use, in the event of an accident, for example, the functional benefit of a damping of an airbag, for example, in the event of multiple vehicle collisions. In this way, characteristics of the impact protection device, in particular an unfolding velocity of an air cushion, are implementable for different weight categories and sizes of persons. A protective effect of the impact protection device can thus be achieved largely regardless of the size and/or weight of the persons to be protected.

According to an example embodiment of the present invention, a pyrotechnic gas generator serves as medium storage. When a pyrotechnic gas generator is used together with the control device of the present invention, the advantage results that no long-term sealing of the medium storage is necessary, for instance with the aid of a bursting element. This considerably reduces the costs, size, and weight of the device for activating an impact protection device.

According to an alternative example embodiment of the present invention, a hybrid gas generator is used as medium storage. The use of a hybrid gas generator together with the control device of the present invention has the advantage that less expensive medium storage devices, i.e., pressure accumulators, can be used, because in hybrid gas generators, the medium for activating an impact protection device is stored at a lower pressure than in pure cold gas generators. In an example embodiment, a multi-stage hybrid gas generator is implemented in which hot gas is used as a first stage, which has the advantage that, at the instant of the required gas generation, in general at the impact instant, the required gas quantity is able to be generated rapidly through a pyrotechnic generation, without the need to provide an adequately dimensioned gas storage.

In an example embodiment, cold gas is additionally or alternatively used as the medium. In this way, a less temperature resistant, more cost-effective material may be used for the impact protection device than the one needed for a device which is to be filled with pyrotechnically generated gases. According to one variation of the cold gas generator, the generator supplies oxyhydrogen as the medium for activating the passenger protection devices. A complex safety concept that is also otherwise associated with pyrotechnics can be dispensed with in this case. Therefore, cost-intensive safety measures, which are otherwise necessary for a hot gas generator in order to prevent a risk of burning for the persons to be protected and thermal damage to the impact protection device, can be avoided, since according to the example embodiments of the present invention, a cold gas generator is made possible and provided.

According to an example embodiment of the present invention, a device for controlling a volume flow of a stored medium for the purpose of activating an impact protection device includes: a valve body in which a chamber is formed and that includes a medium inlet opening to a medium storage at a first end, a control valve opening at a second end, and at least one outlet opening for discharging the medium into the impact protection device between the first end and the second end; a control valve for opening and closing the control valve opening for a passage of the medium; and a control piston in which, along a main extension axis, a passage opening is formed, from a first active surface of the control piston, which is adjacent to the medium inlet opening, to a second active surface of the control piston, which is adjacent to the control valve opening, the first active surface being smaller than the second active surface, the control piston being movable in the chamber of the valve body with the aid of the medium and as a function of a position of the control valve between an initial position, in which the at least one outlet opening is closed by the control piston, and an activation position, in which the at least one outlet opening is opened by the control piston.

The device can, for example, be installed or used in a road-based vehicle such as a passenger car, a truck, a commercial vehicle, or another type of motor vehicle for the purpose of providing, in conjunction with the impact protection device, an improved injury protection for at least one occupant of the vehicle in the event of a collision of the vehicle. The impact protection device can be an air cushion or an airbag or the like. The medium can be a hot gas, cold gas, a mixture of hot gas and cold gas or the like. The medium storage can also be referred to as a gas generator and can be designed to securely enclose the medium to be used to fill the impact protection device up to the point in time of the activation of the impact protection device. The control piston and the valve body can be formed in such a way that they enable a movement of the control piston in the chamber of the valve body between the initial position and the activation position. In this case, the control piston and the chamber of the valve body can be formed in such a way that a low-leakage contact of at least one part of an outer circumferential surface of the control piston at a wall of the chamber is brought about. The control valve can be a solenoid valve. When the control piston is in the initial position, a volume flow of the medium is minimal or equals zero. When the piston is in the activation position, a volume flow of the medium is maximal. When the control valve opening is opened by the control valve, the control piston can be moved by the medium from the initial position toward the activation position or kept in the activation position, the medium being able to flow into the impact protection device. When the control valve opening is closed by the control valve, the control piston can be kept in the initial position by the medium or moved from the activation position toward the initial position, the medium being able to flow into the impact protection device. The control valve can have a flat-type armature or a plunger-type armature. The control piston can, in particular, also be situated as standard in the activation position as the starting position in order to reduce the opening times and the activations, for example.

According to an example embodiment, on a first end, the valve body includes a medium inlet opening to a medium storage that is sealable by a bursting element. The bursting element can be developed to seal the medium storage in the form of a lid and to be destroyed in a simple and rapid manner in the event of a collision, so that the medium is able to flow out of the medium storage, through the device, and can thereby reach the impact protection device. If a bursting element is provided and if the bursting element has burst, the control piston is able to be moved by the medium from the basic position toward the activation position, or be retained in the activation position, when the control valve is open, and be kept in the basic position by the medium or be moved from the activation position toward the basic position when the control valve is closed.

According to an example embodiment, the control valve can be currentlessly closed in order to close the control valve opening for a passage of the medium. In this case, an elastic, for example, is provided to keep the control valve in a closed position. One such example embodiment offers the advantage that an undesired activation of the impact protection device can be prevented or at least mitigated, since the medium keeps the control piston in the initial position or moves it into the initial position when the control valve is closed.

Alternatively, the control valve can be currentlessly opened in order to open the control valve opening for a passage of the medium. In this case, an elastic, for example, is provided to keep the control valve in an opened position. Such an embodiment provides the advantage that an activation of the impact protection device can take place particularly rapidly and therefore the protective function of the device can be available earlier, since, in the case of an opened control valve, the medium moves the control piston into the activation position and keeps it in the activation position.

The valve body can also include at least one other outlet opening for discharging the medium from the control valve into the impact protection device. Such an example embodiment provides the advantage that it can prevent potential pressure waves from the at least one outlet opening from causing a malfunction.

According to an example embodiment, the control piston is designed to cover the outlet openings only partially in the initial position, for example, by a suitable placement or implementation of the outlet openings in the valve body. In this way, at least one of the outlet openings can be at least partially opened in the initial position.

Furthermore, in an example embodiment, the valve body includes, between the at least one outlet opening and the control valve opening, at least one acceleration opening for discharging the medium into the impact protection device. For this purpose, the at least one acceleration opening can be opened in the initial position of the control piston and closed in the activation position of the control piston. Such an example embodiment provides the advantage that the outlet opening can initially be opened rapidly until the control piston covers or closes the acceleration opening, and the control piston can then strike in an attenuated manner due to pressure built up as a result of the reduced volume.

Additionally, in an example embodiment, the control valve includes a ball and a valve needle that includes a calotte for accommodating the ball at an end facing the control valve opening. In this case, a section of the valve body that surrounds the control valve opening can be formed as a valve seat. When the control valve closes the control valve opening, the ball is kept engaged by the calotte of the valve needle against the control valve opening of the valve seat in a fluid-tight manner. Such an example embodiment provides the advantage that a coaxiality may be achieved between the valve seat and the valve needle.

Furthermore, in an example embodiment, a clamping sleeve and a clamping nut, designed to axially brace and radially guide the valve body and the control valve, are provided. In this case, the valve needle of the control valve is guidable in the clamping sleeve and, additionally or alternatively, in the clamping nut. In an example embodiment, the device is also coupleable with the medium storage with the aid of the clamping sleeve. Such an example embodiment provides the advantage that a great position and orientation accuracy can be achieved between the valve body and the control valve and, if necessary, the medium storage.

In an example embodiment, a lift adjusting device for axially adjusting a valve lift of the control valve is also provided. The lift adjusting device can be a lift adjusting disk or the like. Such an example embodiment provides the advantage that an activation time of the impact protection device can also be optimized via the valve lift.

According to an example embodiment of the present invention, a device for activating an impact protection device includes: an example embodiment of the device described above for controlling a volume flow of a medium for the purpose of activating the impact protection device; and a medium storage for storing the medium.

In an example embodiment, the above-described device for activating an impact protection device includes a bursting element for closing the medium inlet opening of the valve body of the device for control toward the medium storage, in conjunction with a medium storage, which stores the medium for activating the impact protection device at least partially under pressure.

In an example embodiment of the above-described device for activating an impact protection device, the control device is disposed transversely to the longitudinal extension of the medium storage, which placement leads to a compact design of the device for activating an impact protection device.

In an example embodiment of the above-described device for activating an impact protection device, the control device is situated concentrically with respect to the medium storage, which placement results in an advantageous outward flow of the medium for activating an impact protection device into the impact protection device.

According to an advantageous example embodiment, the activation device is disposed relative to the impact protection device in a manner that the outlet openings of the control device reach into the impact protection device, i.e., into the airbag.

In an example embodiment, the device described above for controlling is advantageously employed or used in conjunction with the above-described device for activation in order to activate an impact protection device. The device for activation can also include a control unit or can be connected to a control unit designed to activate the control valve for the purpose of opening the control valve opening, the control piston being movable from the initial position into the activation position in the case of a bursting element that has been burst or, for the purpose of closing the control valve opening, the control piston being movable from the activation position into the initial position in the case of a burst bursting element.

According to an example embodiment, a method for controlling a volume flow of a stored pressurized medium for the purpose of activating an impact protection device, the method being carried out in conjunction with an example embodiment of the device described above for controlling a volume flow of a stored pressurized medium for the purpose of activating the impact protection device, includes the following step: activating the control valve for the purpose of opening the control valve opening, the control piston being movable from the initial position into the activation position in the case of a burst bursting element, or for the purpose of closing the control valve opening, the control piston being movable from the activation position into the initial position in the case of a burst bursting element in order to control the volume flow of the medium.

In an example embodiment, the controlling method is advantageously employed or used in conjunction with an example embodiment of the device described above for controlling, to control a volume flow of a stored pressurized medium for the purpose of activating the impact protection device.

The present invention is elucidated in greater detail, by way of example, on the basis of the appended drawings and the following description of preferred exemplary embodiments of the present invention, where elements that are illustrated in the various figures and appear to be similar are identified with identical or similar reference numerals, a repetitive description of these elements being dispensed with.

DETAILED DESCRIPTION

Figure 1:
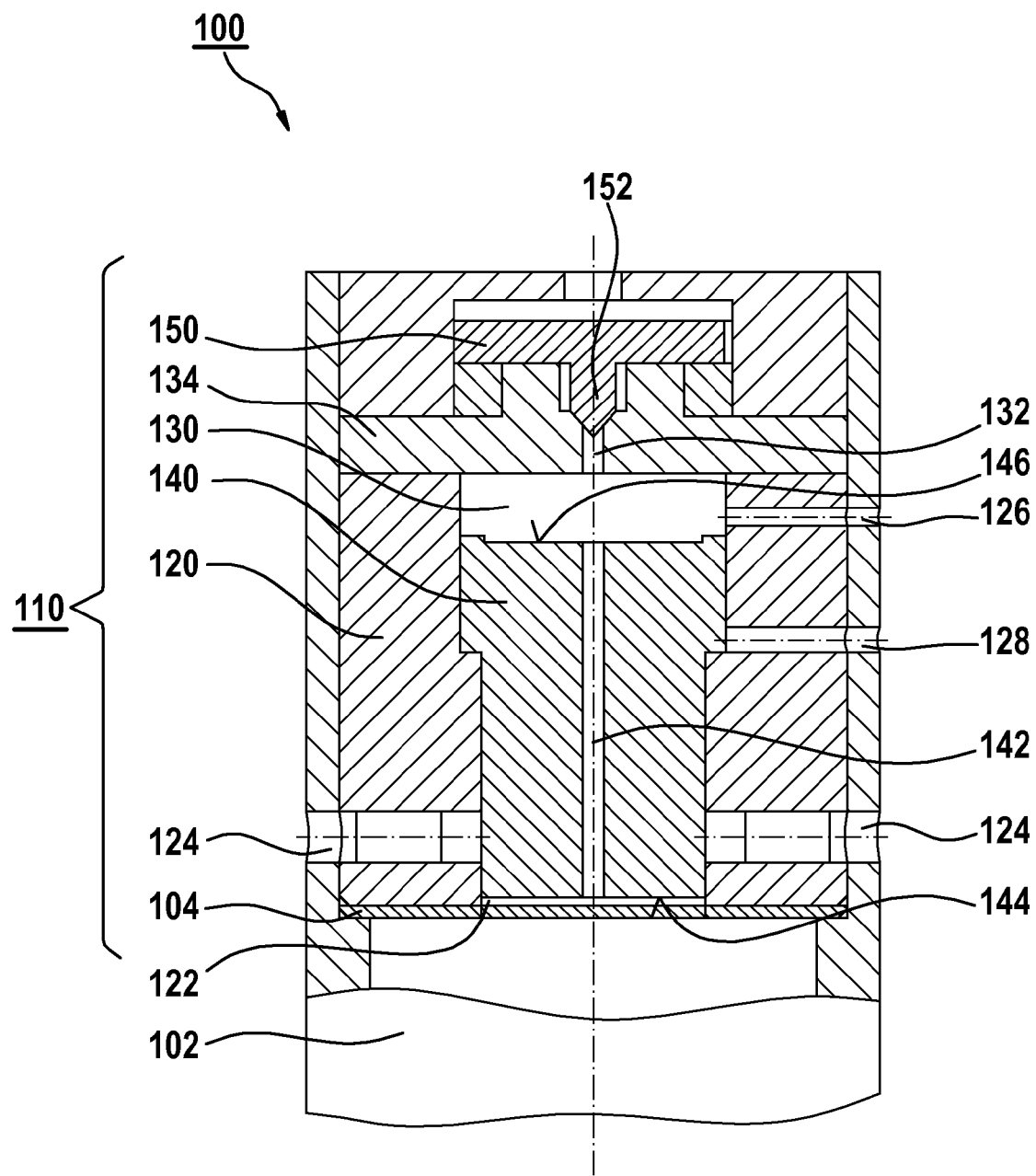
FIGS. 1-7C show views of devices for activating an impact protection device according to example embodiments of the present invention.

FIG. 1 shows a sectional view of a part of a device 100 for activating an impact protection device according to an example embodiment of the present invention. Shown of activating device 100 are a part of a medium storage 102 or pressure storage, a bursting element 104 in the form of a bursting disk, for example, a control device 110 or a device for controlling a volume flow of a stored pressurized medium for the purpose of activating the impact protection device, a valve body 120, a medium inlet opening 122, two outlet openings or bores 124 (only as an example), an acceleration opening or throttle 126, a relief opening or bore 128, a chamber 130, a control valve opening or bore 132, a valve seat disk 134, a control piston 140, a passage opening or control throttle 142, a first active surface 144, a second active surface 146, a control valve 150 or a pilot valve, and a valve needle 152.

According to an example embodiment of the present invention, the impact protection device is an air cushion of an airbag, the latter not being shown in FIG. 1. Device 100 for activating the impact protection device is, for example, an activating device in the form of a cold gas generator or hybrid gas generator including a control module for volume flow formation for the purpose of activating or filling the air cushion. According to the example embodiment illustrated in FIG. 1, the medium is thus cold gas or a mixture of cold gas and pyrotechnically produced hot gas. Device 100 for activating the impact protection device includes medium storage 102, bursting element 104, and control device 110 for controlling the volume flow of the stored pressurized medium for the purpose of activating the impact protection device. Control device 110 includes valve body 120, control piston 140, and control valve 150. Control device 110 is coupled to medium storage 102, bursting element 104 being situated between them. Valve body 120 and control piston 140 are situated between control valve 150 and medium storage 102. Bursting element 104 is designed to keep the pressurized medium in an intact state in medium storage 102 and to allow the medium in a burst state to flow from medium storage 102 into control device 110 and, if necessary, into the air cushion.

According to the example embodiment illustrated in FIG. 1, valve body 120 is a hollow cylindrical component. Chamber 130 extends in valve body 120 along a longitudinal extension axis of valve body 120 through valve body 120, and is designed to accommodate control piston 140. At a first end, valve body 120 or chamber 130 includes medium inlet opening 122 to medium storage 102 which is closed by bursting element 104. At a second end, valve body 120 includes valve seat disk 134 including control valve opening 132 to control valve 150. Valve seat disk 134 is, for example, assigned to either valve body 120 or provided as a separate element. Chamber 130 thus includes control valve opening 132 at the second end.

Between the first end and the second end or between medium inlet opening 122 and control valve opening 132, valve body 120 or chamber 130 includes outlet openings 124 for discharging the medium into the impact protection device. Between outlet openings 124 and control valve opening 132, valve body 120 or chamber 130 also includes acceleration opening 126 for discharging the medium into the impact protection device. Between outlet openings 124 and acceleration opening 126, valve body 120 or chamber 130 also includes a relief opening 128, as an example, for relieving a vacuum between valve body 120 and control piston 140. Relief opening 128 is situated in the area of a step-shaped stop section of valve body 120 or chamber 130. The step-shaped stop section is used as a stop for control piston 140. Between the step-shaped stop section and medium inlet opening 122, chamber 130 includes a first inner diameter, which is smaller than a second inner diameter of chamber 130 between the step-shaped stop section and control valve opening 132.

Control valve 150 is designed for opening and closing control valve opening 132 for a passage of the medium. According to an example embodiment, control valve 150 is currentlessly closed for the purpose of closing control valve opening 132 for a passage of the medium, an elastic keeping control valve 150 in a closed position. According to an alternative embodiment, control valve 150 is currentlessly open for the purpose of opening control valve opening 132 for a passage of the medium, an elastic keeping control valve 150 in an opened position.

Control piston 140 is movably situated in chamber 130 and includes passage opening 142, first active surface 144, and second active surface 146. Passage opening 142 extends along a main extension axis or a longitudinal extension axis of control piston 140 from first active surface 144 up to second active surface 146. First active surface 144 of control piston 140 is situated adjacently to medium inlet opening 122 of valve body 120. Second active surface 146 of control piston 140 is situated adjacently to control valve opening 132. In this case, first active surface 144 is smaller than second active surface 146. Control piston 140 is formed in such a way that at least one subsection of its outer circumferential surface rests against a wall of chamber 130 in a fluid-tight manner. Control piston 140 includes a step-shaped collar section. A first outer diameter of control piston 130, between first active surface 144 and the step-shaped collar section, is smaller than a second outer diameter of control piston 130 between the step-shaped collar section and second active surface 146.

Control piston 140 is movable in chamber 130 of valve body 120 with the aid of the medium and as a function of a position of control valve 150 between (a) an initial position in which outlet openings 124 are closed and acceleration opening 126 is opened by control piston 140 and (b) an activation position in which outlet openings 124 are opened and acceleration opening 126 is closed by control piston 140 for medium flowing through. FIG. 1 shows the initial position of control piston 140. Here, the step-shaped collar section of control piston 140 is situated resting against the step-shaped stop section of valve body 120. A function and an operation of device 100 are discussed below.

Figure 2:
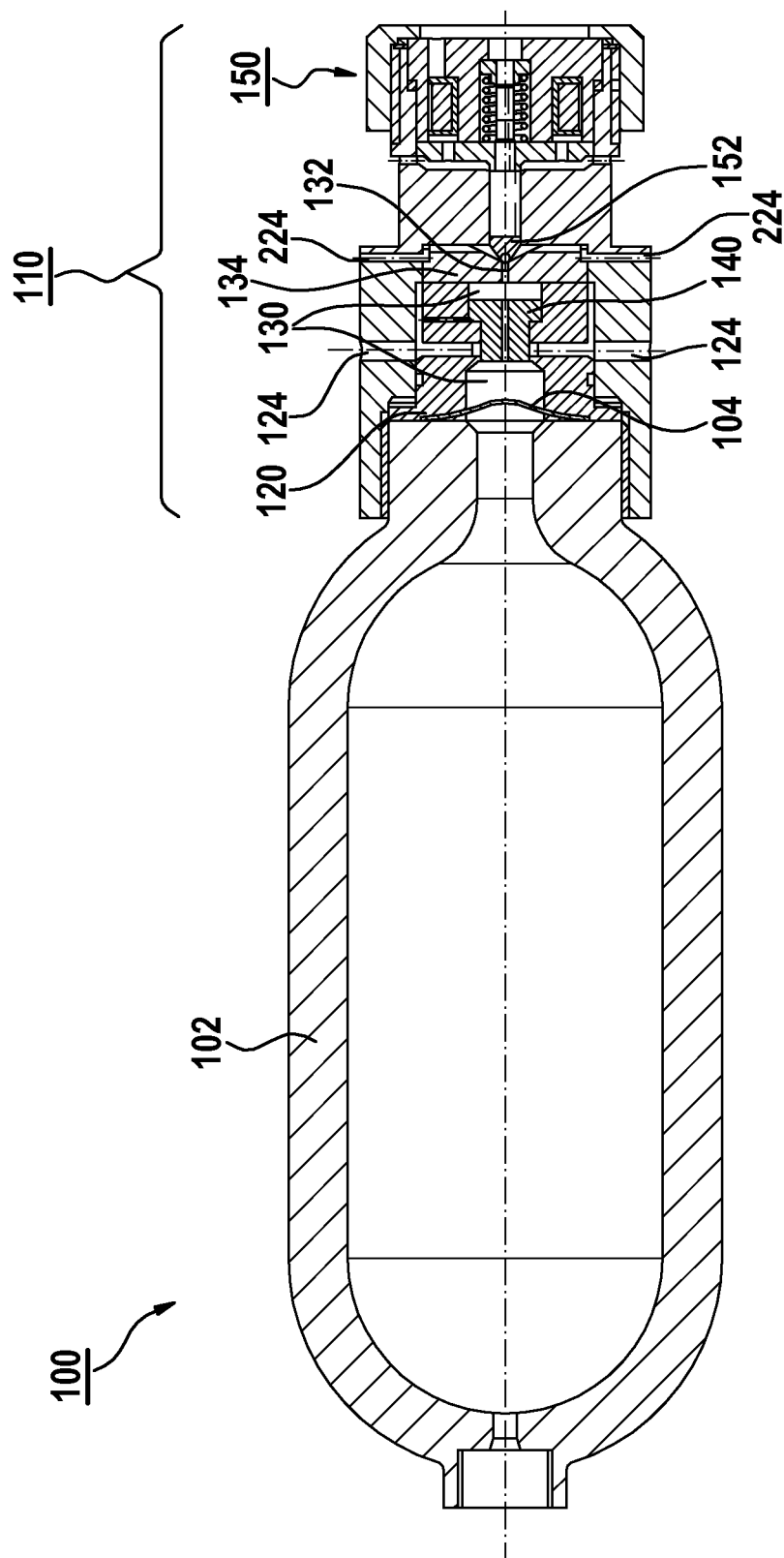

FIG. 2 shows a more comprehensive sectional view of device 100 of FIG. 1. In the illustration of FIG. 2, medium storage 102 and control valve 150 are recognizable in a more complete manner. In addition to the illustration of FIG. 1, the illustration of FIG. 2 of device 100 shows two additional outlet openings 224 (only as an example) for discharging the medium from control valve 150 into the impact protection device. Additional outlet openings 224 are situated on a side of valve seat disk 134 that faces away from control piston 140 and faces control valve 150. The stored pressurized medium is situated within medium storage 102 and kept in medium storage 102 with the aid of bursting element 104. Since bursting element 104 is intact in FIG. 2, ambient pressure prevails, for example, outside of medium storage 102, which is closed by bursting element 104.

Figure 3:
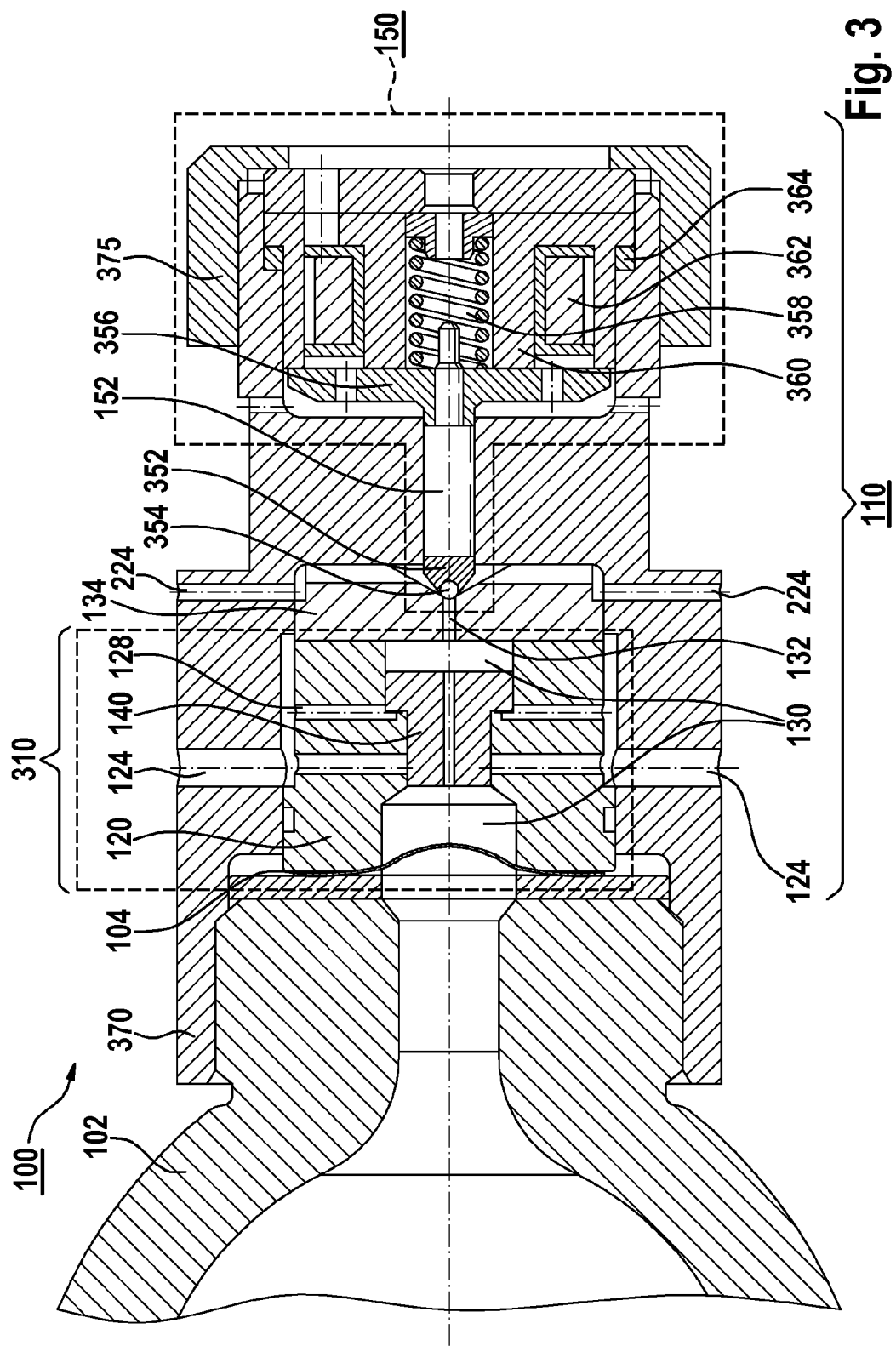

FIG. 3 shows a sectional view of device 100 from FIG. 2. In the illustration of FIG. 3, medium storage 102 is shown only partially, control device 110 being illustrated in detail. Shown of device 100 are a part of medium storage 102, bursting element 104, control device 110, valve body 120, outlet openings 124, relief opening 128, chamber 130, control valve opening 132, valve seat disk 134, control piston 140, control valve 150, valve needle 152, additional outlet openings 224, a control module 310, a calotte 352, a ball 354, an armature 356, a spring 358 or other elastic element, a pot magnet 360, an electric coil 362, a lift adjusting disk (or other device) 364, a clamping sleeve 370, and a clamping nut 375. Control module 310 includes valve body 120 and control piston 140.

Control or pilot valve 150 is designed, for example, as a solenoid valve. Control valve 150 includes valve needle 152, calotte 352, ball 354, armature 356, spring 358, pot magnet 360, electric coil 362, and lift adjusting disk 364. Pot magnet 360 and electric coil 362 are also referred to, for example, as a solenoid assembly. At an end facing control valve opening 132, valve needle 152 is provided with calotte 352. Calotte 352 is designed to accommodate ball 354 for sealing or opening and closing control valve opening 132. An end of valve needle 152 facing away from control valve opening 132 is accommodated in an area of the solenoid assembly of control valve 150. Valve needle 152 is movably situated with the aid of the solenoid assembly for the purpose of opening and closing control valve opening 132. Lift adjusting disk 364 is designed for axially adjusting a valve lift of control valve 150.

According to an example embodiment, control valve 150 is currentlessly closed for the purpose of closing control valve opening 132 for a passage of the medium, spring 358 being designed to keep control valve 150 in the closed position. According to an alternative example embodiment, control valve 150 is currentlessly opened for the purpose of opening control valve opening 132 for a passage of the medium, spring 358 being designed to keep control valve 150 in the opened position.

Clamping sleeve 370 and clamping nut 375 are designed to axially brace and radially guide valve body 120 or control module 310 and control valve 150. In this case, valve needle 152 of control valve 150 is guided in clamping sleeve 370 and/or in clamping nut 375. According to the example embodiment shown in FIG. 3, clamping sleeve 370 extends from medium storage 102 up to the solenoid assembly of control valve 150, and clamping nut 375 is situated in the area of the solenoid assembly of control valve 150. In this case, the solenoid assembly is guided radially in clamping sleeve 370. Furthermore, valve needle 152 is guided radially in clamping sleeve 370. A volume of chamber 130 between control piston 140 and valve seat disk 134 is also referred to as a control volume. A pressure is relieved in the control volume of chamber 130 by opening control valve 150. The medium flowing during the process is discharged via additional outlet opening 224.

According to an example embodiment, armature 356 of control valve 150 is a flat-type armature. According to an alternative example embodiment, armature 356 of control valve 150 is a plunger-type armature. According to an example embodiment, control valve 150 and control module 310 are radially guided in a sleeve and axially braced to one another. According to an example embodiment, outlet openings 124 and additional outlet openings 224 are separated. According to an alternative example embodiment, outlet openings 124 and additional outlet openings 224 are combined. According to an example embodiment, control piston 140 covers outlet openings 124 only partially in the initial position.

Figure 4:
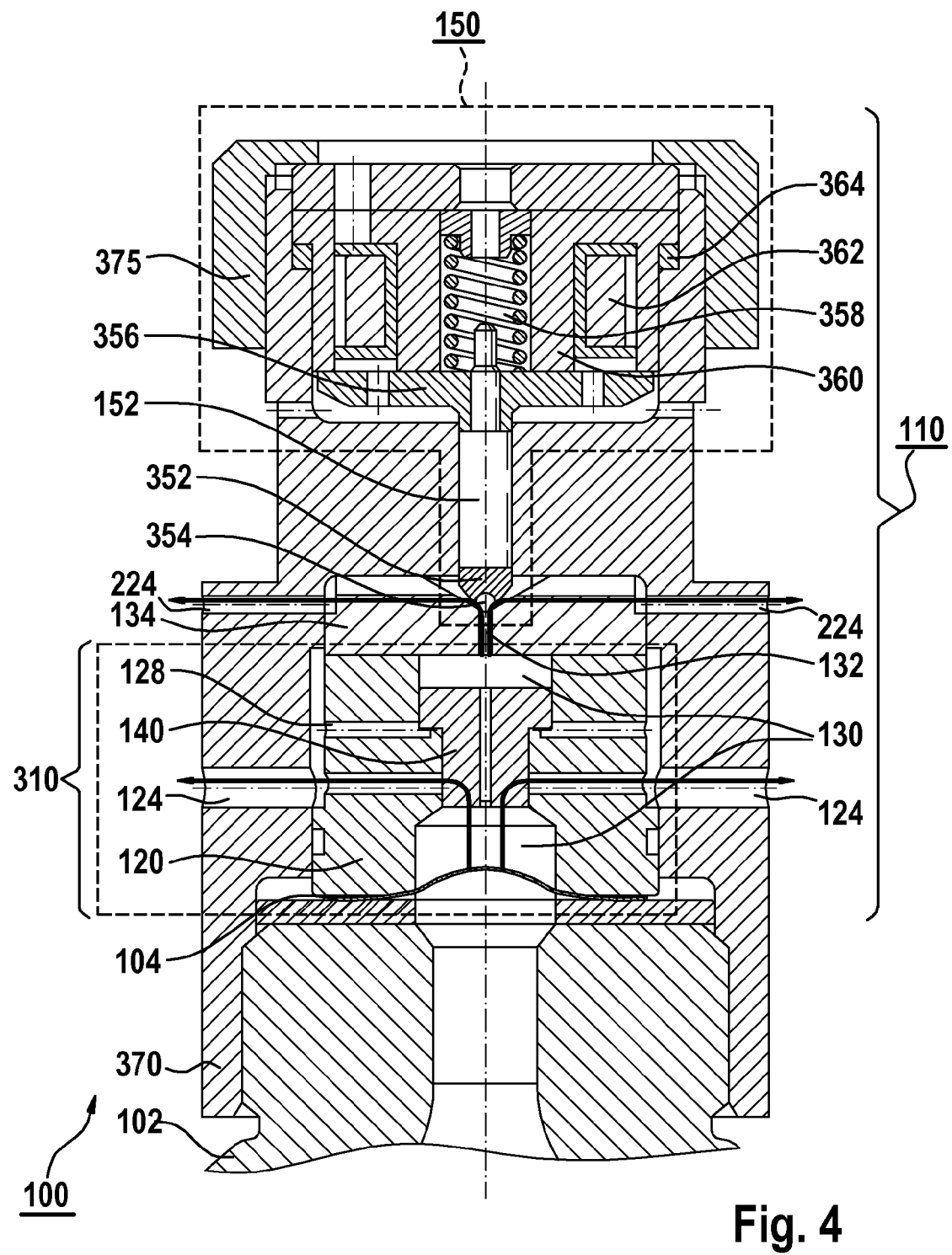

FIG. 4 shows a sectional view of device 100 from FIG. 3. The illustration in FIG. 4 corresponds in general to the illustration from FIG. 3 with the exception that a smaller subsection of medium storage 102 is shown and a discharge path of the medium from outlet openings 124 and additional outlet openings 224 is symbolically illustrated using arrows.

Figure 5:
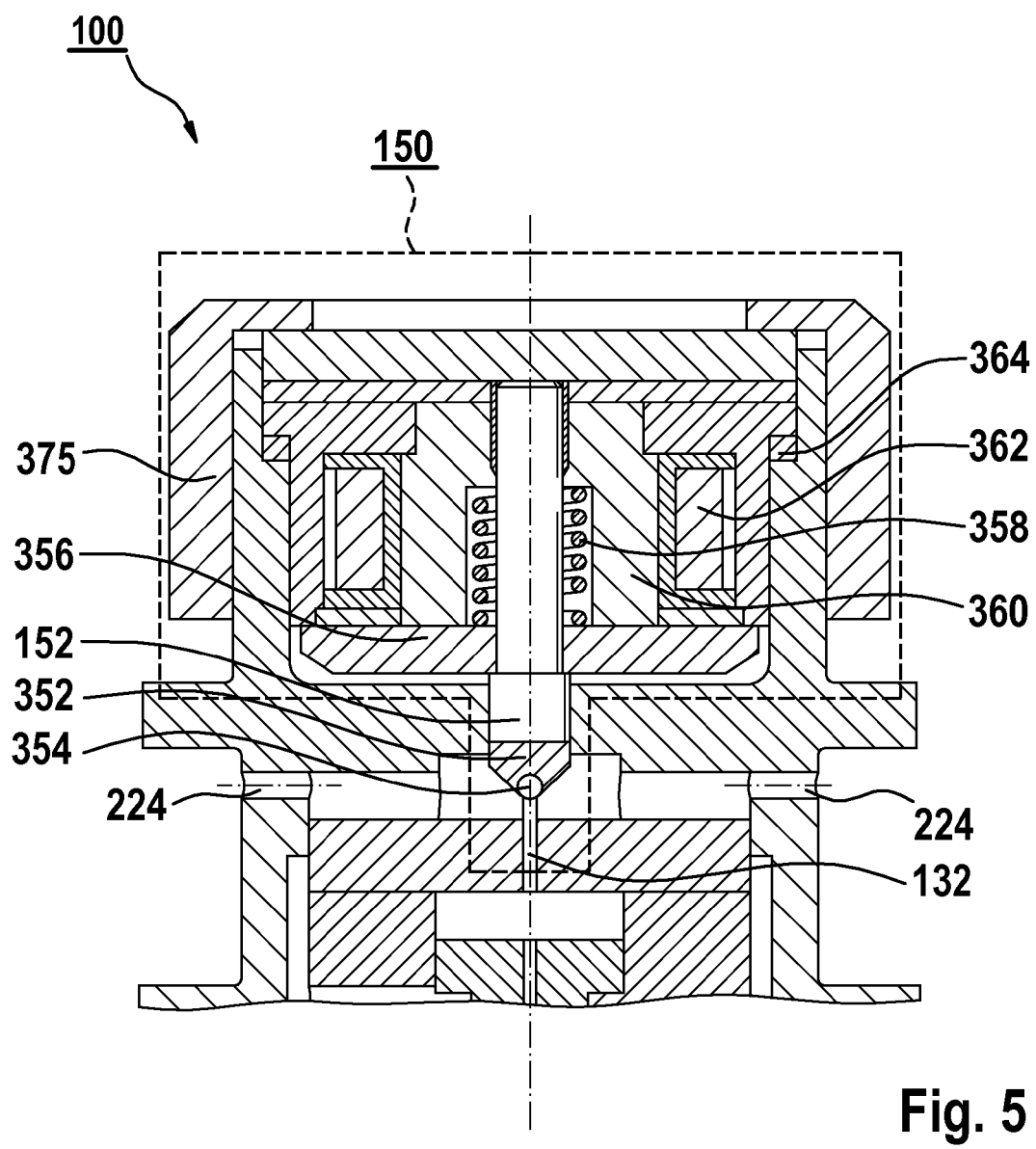

FIG. 5 shows a sectional view of a device 100 according to an example embodiment of the present invention. Device 100 in FIG. 5 generally corresponds to the device illustrated in FIG. 3 with the exception that valve needle 152 of control valve 150 is guided in pot magnet 356 and clamping nut 375.

Figure 6A:
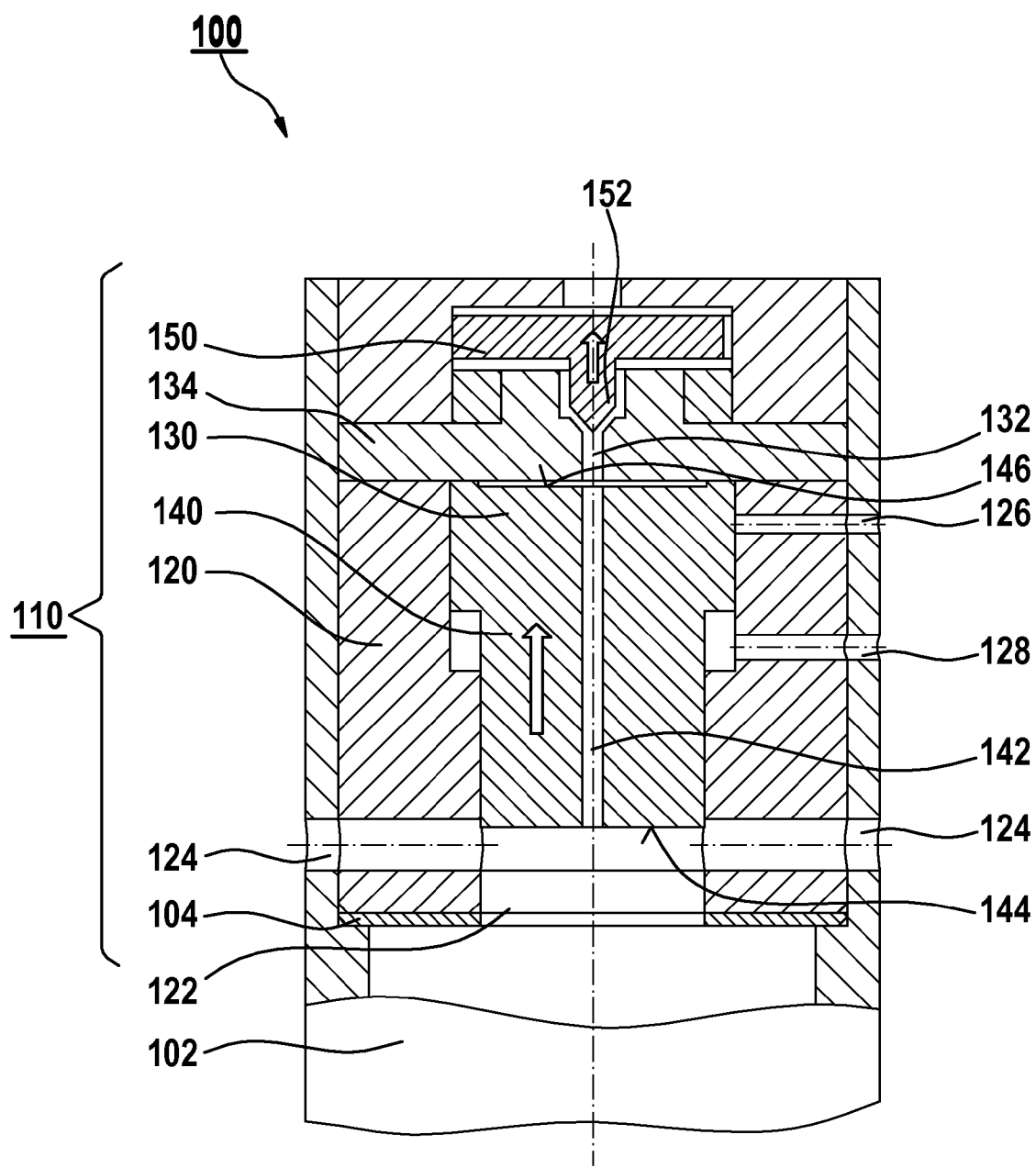
Figure 6B:
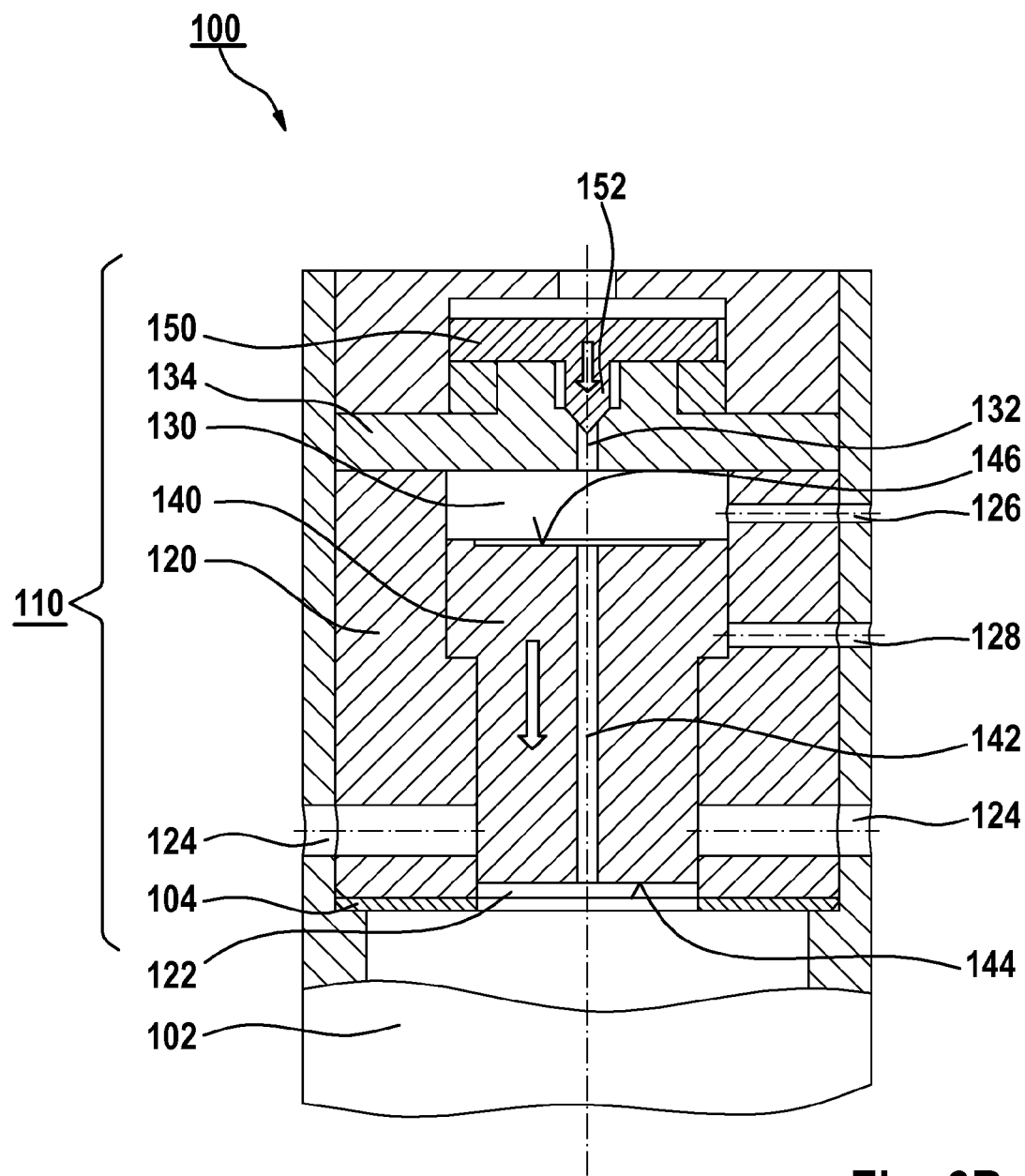

FIGS. 6A and 6B show sectional views of device 100 from one of FIGS. 1-5. Here, the illustrations in FIGS. 6A and 6B correspond to the illustration from FIG. 1 with the exception that arrows are plotted which symbolize a movement of control piston 140 and of control valve 150, and that control piston 140 and control valve 150 are situated in positions which deviate at least partially from the positions shown in FIG. 1. Even if it is not explicitly shown, the movement stages of control piston 140 and of control valve 150, which are illustrated in FIGS. 6A and 6B, are conditional on a destroyed or burst state of bursting element 104 due to squibs, for example, and on the medium flowing through control device 110 as a result thereof.

FIG. 6A shows device 100, control valve opening 132 being opened by control valve 150 and control piston 140 being situated in the activation position after a movement from the initial position. During this movement, the stored medium flowing out of medium storage 102 acts on first active surface 144 and pushes control piston 140 in the direction of control valve 150. The highly pressurized stored medium flows in the direction of the impact protection device and fills the air cushion, for example. For this purpose, the medium also flows through passage opening 142 of control piston 140. As long as control valve 150 is open, a pressure triggering a backward movement of control piston 140 toward the initial position cannot be built up on second active surface 146 and a lower pressure acts on second active surface 146 than on first active surface 144. Control piston 140 remains in the activation position in which outlet openings 124 are opened. Relief opening 128 is used to relieve a vacuum which forms between chamber 130 and control piston 140. Acceleration opening 126 causes an initially more rapid piston movement in the event of the movement of control piston 140 toward the activation position until control piston 140 covers acceleration opening 126, so that control piston 140 is moved in an attenuated manner due to the pressure which is built up by the reduced volume and is stopped.

FIG. 6B shows device 100, control valve opening 132 being closed by control valve 150 and control piston 140 being situated in the initial position after a backward movement from the activation position. By closing control valve 150, a pressure triggering the backward movement of control piston 140 toward the initial position builds up on second active surface 146. Due to the fact that second active surface 146 is greater than first active surface 144, the built-up force on second active surface 146 is also greater. This results in that control piston 140 is pushed back toward the initial position by the medium. Control piston 140 is pushed up to the stop and closes outlet openings 124. A sealing takes place either radially by a piston guide or axially by a flat seat or a conical seat. A fixing of control piston 140 takes place, for example, with the aid of a pressure spring or other plastic elements, e.g., an 0 ring. According to an example embodiment, the initial position or the starting position of control piston 140 is open or in such a way that outlet openings 124 are opened to save opening times and activations, for example.

Figure 7A:
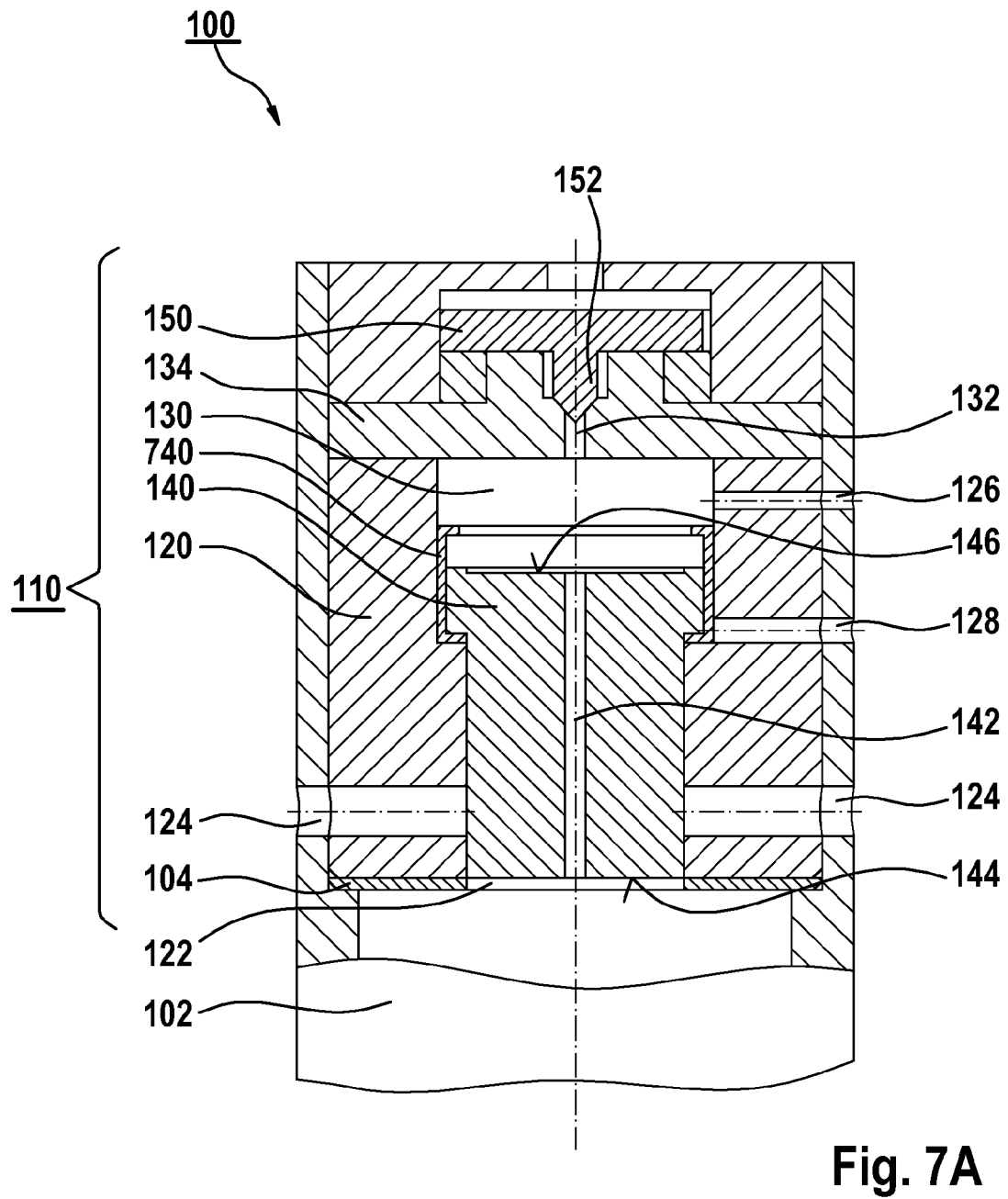
Figure 7B:
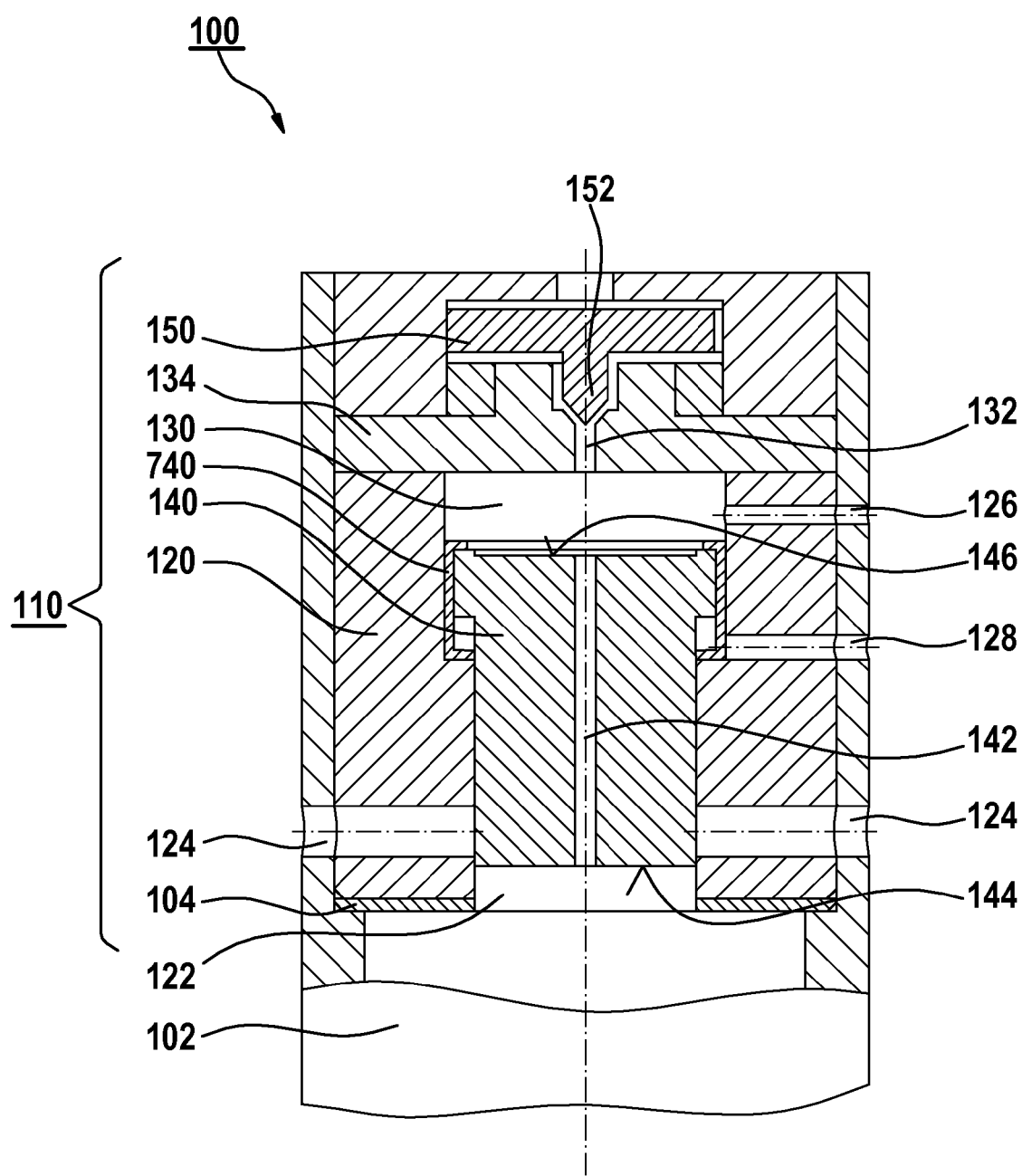
Figure 7C:
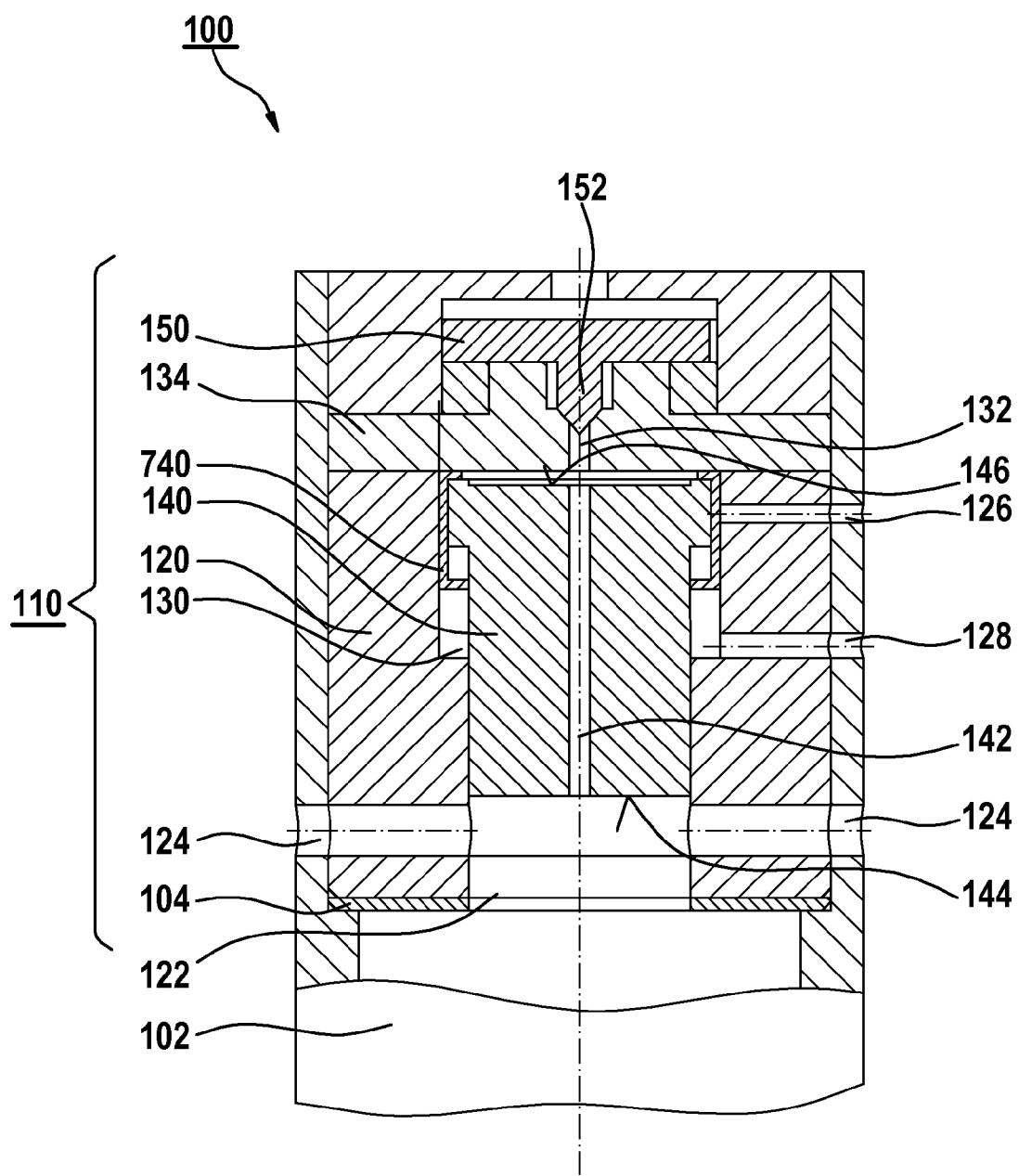

FIGS. 7A-7C show sectional views of a device 100 according to an example embodiment of the present invention, similar to those of one of FIGS. 1-6B. The illustrations in FIGS. 7A-7C correspond to the illustration from FIG. 1 with the exception that a sleeve 740 is provided and control piston 140 and control valve 150 are situated in positions which deviate at least partially from the positions shown in FIG. 1. Sleeve 740 is situated on control piston 140. In this case, sleeve 740 extends from the step-shaped collar section of control piston 140 to second active surface 146 of control piston 140 and partially spans second active surface 146 of control piston 140. A relative movement between control piston 140 and sleeve 740 is possible.

FIG. 7A shows device 100, control piston 140 being situated in the initial position in which outlet openings 124 are closed by the control piston 140. Control piston 140 and sleeve 740 are situated resting against the step-shaped stop section of chamber 130 or of valve body 120. In this case, sleeve 740 is situated between the step-shaped collar section of control piston 140 and step-shaped stop section of chamber 130 or of valve body 120. In this case, a gap is situated between second active surface 146 of control piston 140 and sleeve 740.

FIG. 7B shows device 100 for activation, control piston 140 being situated between the initial position and the activation position, outlet openings 124 being partially opened by the control piston 140 (not apparent from the figures). For this purpose, sleeve 740 is situated resting against the step-shaped stop section of chamber 130 or of valve body 120 and second active surface 146 of control piston 140 is situated resting against sleeve 740.

FIG. 7C shows device 100 for activation, control piston 140 being situated in the activation position in which outlet openings 124 are opened by control piston 140. Control piston 140 and sleeve 740 are situated resting against valve seat disk 134. In this case, sleeve 740 is situated between second active surface 146 of control piston 140 and valve seat disk 134. In this case, a gap is situated between the step-shaped collar section of control piston 140 and sleeve 740.

According to the example embodiment illustrated in FIGS. 7A-7C, an abrupt change in an acceleration procedure of control piston 140 is thus possible with the aid of sleeve 740 during a closing movement or backward movement from the activation position toward the initial position. Therefore, a desired pressure buildup is implementable in the first milliseconds of an activation of the impact protection device. A desired closing procedure of control piston 140 is thus advantageously possible. In this way, the pressure buildup is definable during the first milliseconds of the activation of the impact protection device.

FIGS. 8A-8I show views and diagrams of movement stages of control piston 140 of the device from FIGS. 7A-7C. FIGS. 8A, 8B, 8D, 8F, and 8H each shows a schematic sectional view of a part of chamber 130, of control piston 140 including passage opening 142, first active surface 144 as well as second active surface 146 and sleeve 740 in different movement stages of control piston 140 in chamber 130. Furthermore, FIGS. 8C, 8E, 8G, and 8I show acceleration/time diagrams associated with the movement of control piston 140, in each of which time 't' is plotted on the abscissa and acceleration 'a' is plotted on the ordinate.

Figure 8A:
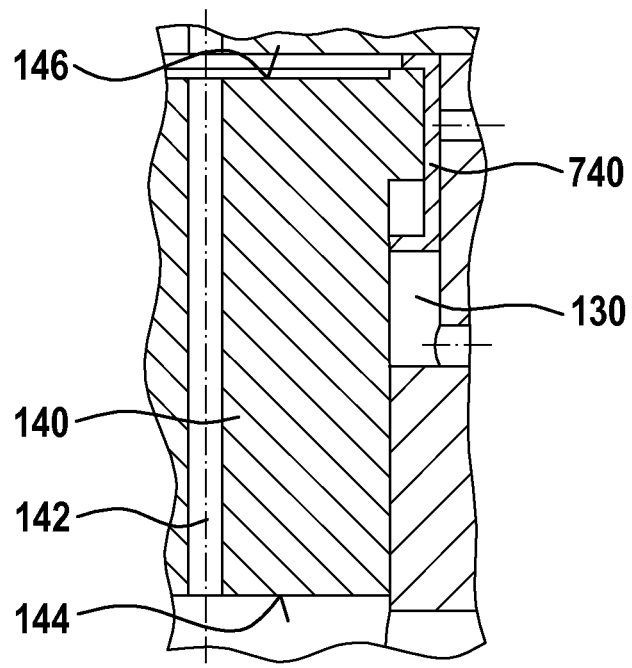
FIGS. 8A-8I show views and diagrams of movement stages of the control piston of the device for activation of FIGS. 7A-7C, according to example embodiments of the present invention.

FIG. 8A shows control piston 140 in a movement stage which corresponds to the situation illustrated in FIG. 7C. In this case, the control valve is closed and control piston 140 is in the activation position. A pressure, which is applied by the medium, acts on second active surface 146 of control piston 140 and on sleeve 740. In the activation position, an acceleration of control piston 140 is essentially zero.

Figure 8B:
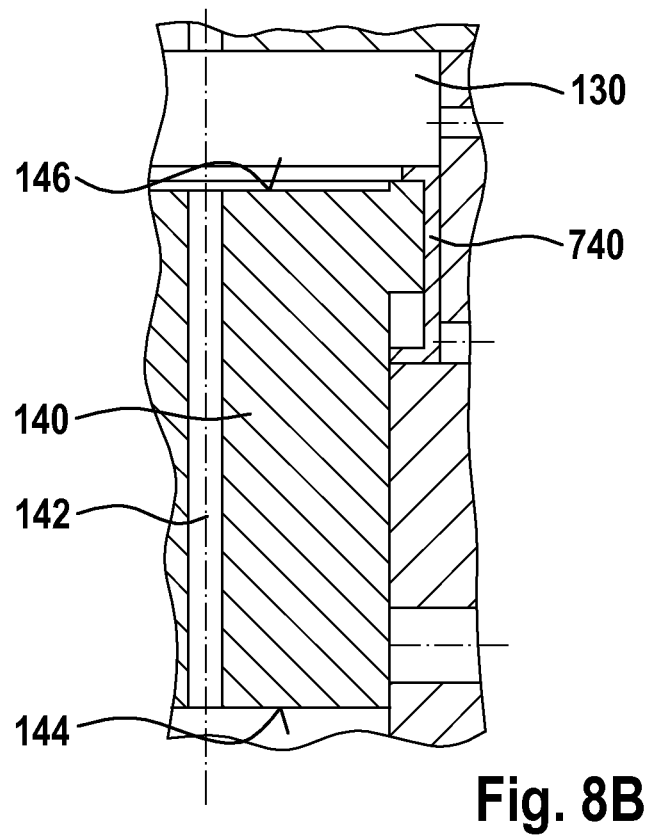

FIG. 8B shows control piston 140 in a movement stage in which control piston 140 is in a backward movement from the activation position toward the initial position. The movement stage illustrated in FIG. 8B corresponds in this case to the position of control piston 140 illustrated in FIG. 7B. For this purpose, the control valve is closed. Sleeve 740 is situated resting against the step-shaped stop section of chamber 130. Control piston 140 is in this case moved or driven by the pressure of the medium onto second active surface 146.

Figure 8C:
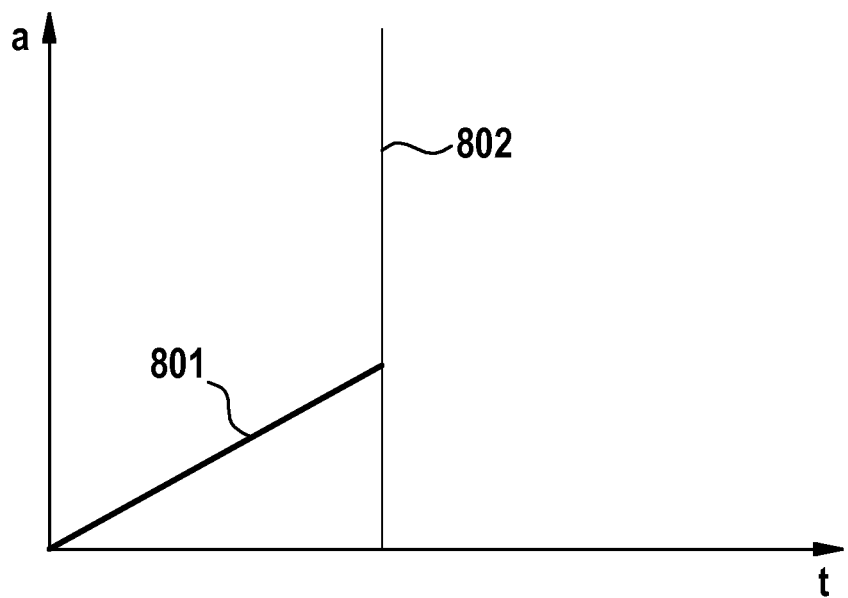

For illustrative purposes only, FIG. 8C shows an acceleration/time diagram, as an example, which is assigned to a movement of control piston 140 from the activation position from FIG. 8A into the movement stage from FIG. 8B. A first acceleration profile 801 is plotted in the form of a straight line having a first ascending slope from the coordinate origin up to a boundary line 802, which runs in parallel to the ordinate. Boundary line 802 represents a point in time of a stop of the sleeve at the step-shaped stop section of the chamber. Shown acceleration profile 801 is provided for illustrative purposes and actual profiles can deviate from the shown profile in different example embodiments.

Figure 8D:
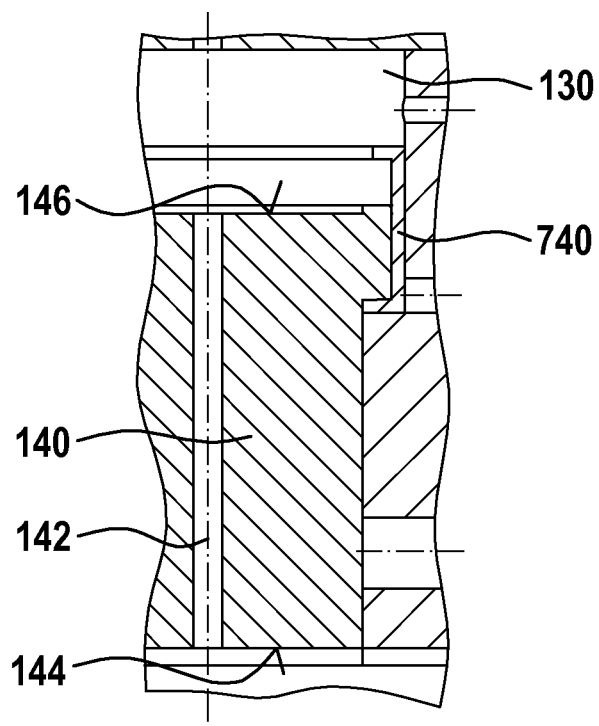

FIG. 8D shows control piston 140 in a movement stage in which control piston 140 is in the initial position. The movement stage illustrated in FIG. 8D corresponds in this case to the position of control piston 140 illustrated in FIG. 7A. Here, the control valve is closed. The step-shaped collar section of control piston 140 and sleeve 740 are situated resting against the step-shaped stop section of chamber 130. Control piston 140 is moved by the pressure of the medium on second active surface 146.

Figure 8E:
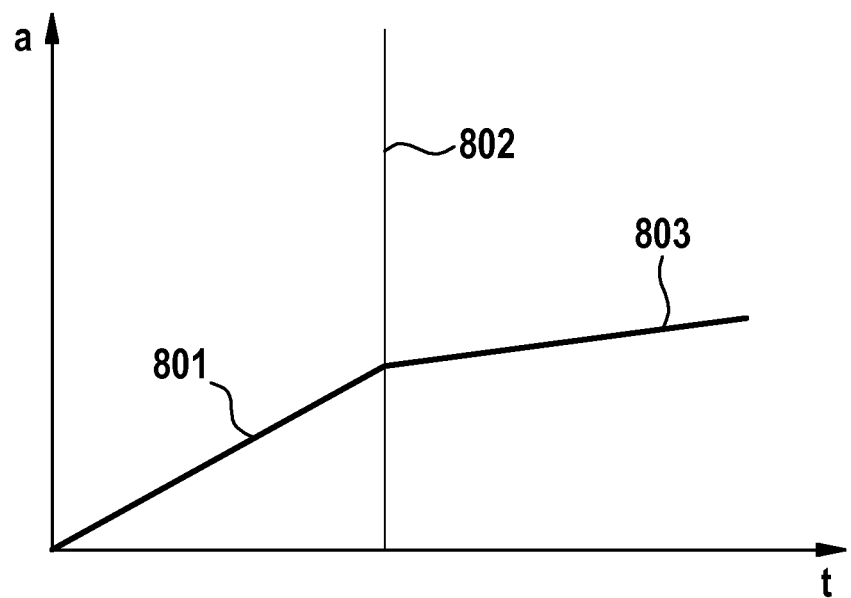

For illustrative purposes only, FIG. 8E shows an acceleration/time diagram, as an example, which is assigned to a movement of control piston 140 from the activation position of FIG. 8A through the movement stage of FIG. 8B into the initial position of FIG. 8D. The illustration in FIG. 8E in this case corresponds to the illustration from FIG. 8C with the exception that a second acceleration profile 803 is plotted in the form of a straight line having a second ascending slope from boundary line 802 in the positive abscissa direction. Here, the second ascending slope is smaller than the first ascending slope. An acceleration of control piston 140 before boundary line 802 is therefore greater than after boundary line 802. This means that second acceleration profile 803 of the control piston after boundary line 802 is abruptly flatter than first acceleration profile 801 before boundary line 802. Shown acceleration profiles 801, 803 are provided for purposes only and actual profiles can deviate from the shown profiles in accordance with different example embodiments. For example, the ascending slope of second acceleration profile 803 can also be equal to or greater than the ascending slope of first acceleration profile 801.

Figure 8F:
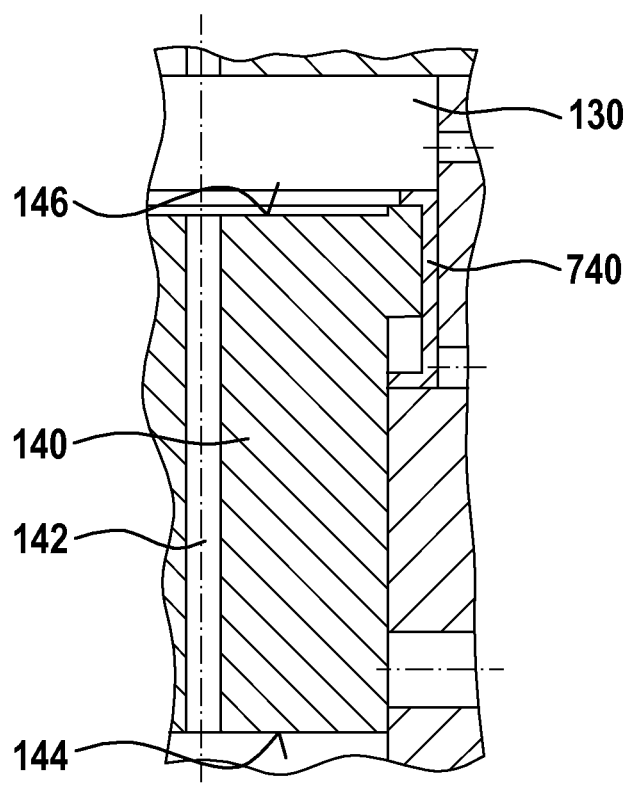

FIG. 8F shows control piston 140 in a movement stage which corresponds to the situation illustrated in FIG. 7B. Here, the control valve is opened and control piston 140 is illustrated in a movement between the initial position and the activation position. In this movement stage, sleeve 740 does not influence an acceleration profile of control piston 140.

Figure 8G:
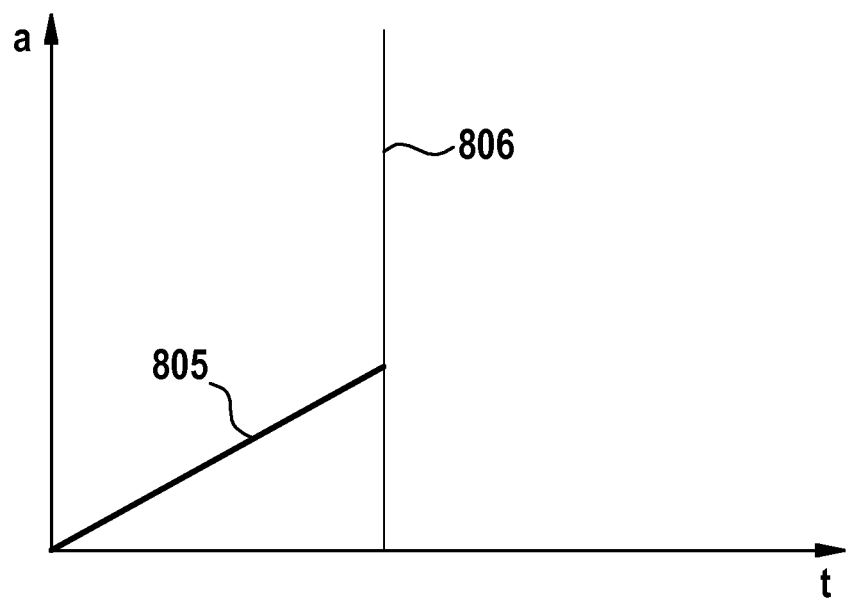

For illustrative purposes only, FIG. 8G shows an acceleration/time diagram, as an example, which is assigned to a movement of control piston 140 from the initial position of FIG. 8D into the movement stage of FIG. 8F. The illustration in FIG. 8G corresponds, in principle, to the illustration from FIG. 8C with the exception that, instead of the first acceleration profile, a third acceleration profile 805 is plotted, and, instead of the boundary line, a further boundary line 806 is plotted. Third acceleration profile 805 has a third ascending slope and corresponds to the first acceleration profile from FIG. 8C with regard to the illustration in the diagram, but it represents a movement of control piston 140 in the opposite direction. Further boundary line 806 represents a point in time of a stop of second active surface 146 of control piston 140 on sleeve 740. Shown acceleration profile 805 is provided for illustrative purposes only and actual profiles can deviate from the shown profile in different example embodiments.

Figure 8H:
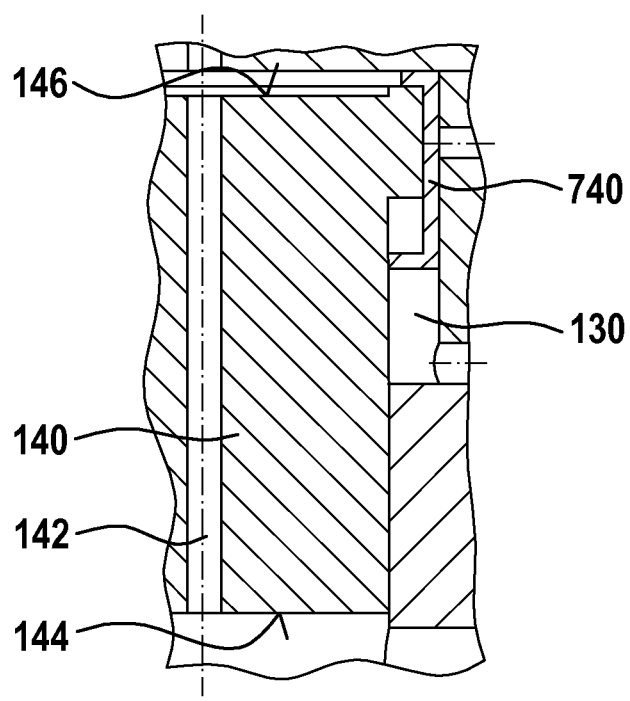

FIG. 8H shows control piston 140 in a movement stage that corresponds to the situation illustrated in FIG. 8A, where control piston 140 is returned to, and is situated again in, the activation position.

Figure 8I:
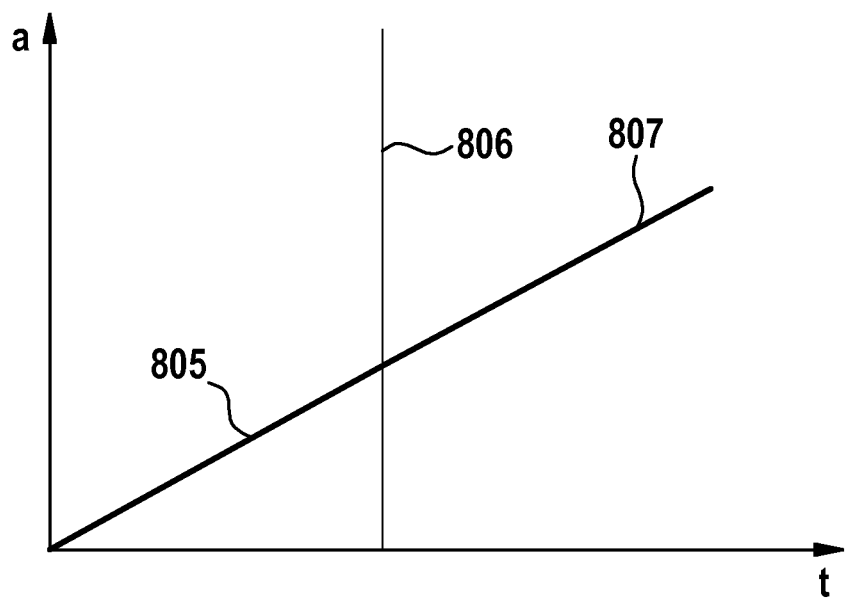

For illustrative purposes only, FIG. 8I shows an acceleration/time diagram, as an example, which is assigned to a movement of control piston 140 from the initial position of FIG. 8D through the movement stage of FIG. 8F into the activation position of FIG. 8H. The illustration in FIG. 8I in this case corresponds to the illustration from FIG. 8G with the exception that a fourth acceleration profile 807 is plotted in the form of a straight line having a fourth ascending slope from further boundary line 806 in the positive abscissa direction. In this case, the third ascending slope of third acceleration profile 805 is essentially as large as the fourth ascending slope of fourth acceleration profile 807. An acceleration of control piston 140 before further boundary line 806 is therefore essentially as large as after boundary line 802. Shown acceleration profiles 805, 807 are provided for illustrative purposes only and actual profiles can deviate from the shown profiles in accordance with different example embodiments. For example, the ascending slope of fourth acceleration profile 807 can also be smaller or greater than the ascending slope of third acceleration profile 805.

Figure 9:
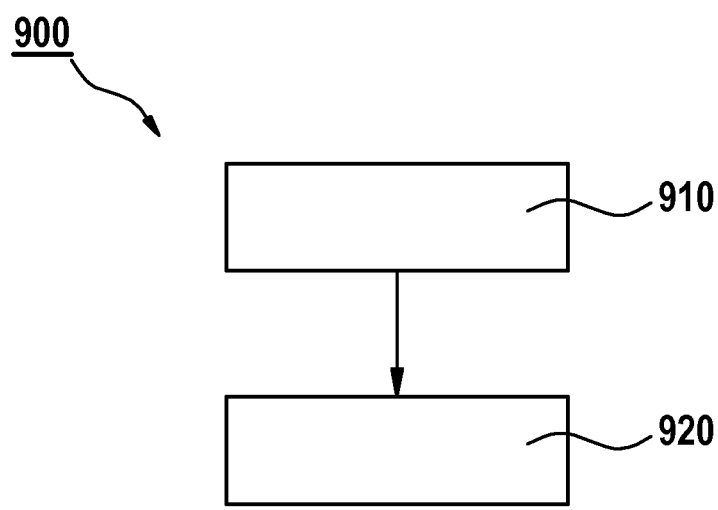
FIG. 9 is a flowchart of a method for control, according to an example embodiment of the present invention.

FIG. 9 is a flowchart of a method 900 for controlling a volume flow of a stored pressurized medium for the purpose of activating an impact protection device according to an example embodiment of the present invention. Method 900 is carried out according to the example embodiment of the present invention shown in FIG. 9 in conjunction with a control device of one of FIGS. 1-7C. Method 900 includes a step 910 of reading in an activation signal which represents a piece of information regarding at least one impact protection characteristic of an impact and/or at least one physical property of a person to be protected by the impact protection device. Method 900 includes a step 920 of activating the control valve for the purpose of opening the control valve opening, the control piston being movable from the initial position into the activation position in the case of a burst bursting element, or for the purpose of closing the control valve opening, the control piston being movable from the activation position into the initial position in the case of a burst bursting element in order to control the volume flow of the medium. For this purpose, step 920 of activating is carried out as a function of the activation signal.

Figure 10:
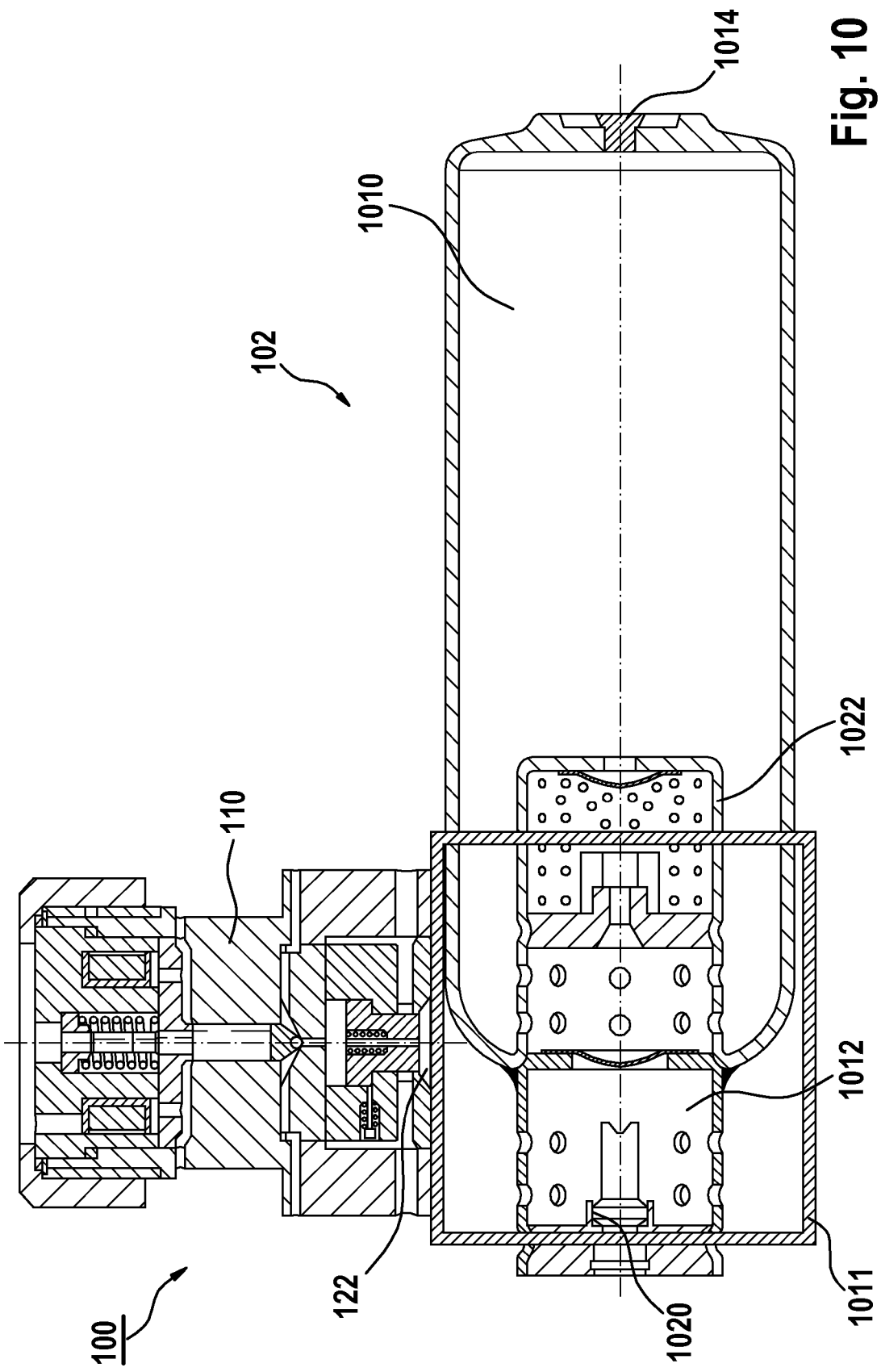
FIG. 10 provides a cross-sectional view of a device for activating an impact protection device, which is disposed transversely to the longitudinal extension of a medium storage, in the form of a hybrid gas generator, according to an example embodiment of the present invention.

FIG. 10 provides a cross-sectional view of device 100 for activating an impact protection device according to an example embodiment of the present invention, in which control device 110 is disposed transversely to the longitudinal extension of a medium storage 102 in the form of a hybrid gas generator. Shown are a container 1010 for storing cold gas. Container includes has a first outlet opening 1012 with respect to control device 110. This first outlet opening 1012 of the container communicates with medium inlet opening 122 of control device 110, indicated by box 1011 around first outlet opening 1012 of container 1010. Squibs 1020 and a pyrotechnic propelling charge 1022 for the gas generation are situated in the region of first outlet opening 1012 of the container. Container 1010 includes a second opening 1014 on the side of container 1010 that lies across from first outlet opening 1012. This second opening 1014 can be utilized for filling container 1010 with an appropriate medium such as an appropriate cold gas for activation of an impact protection device. A further function of second opening 1014 is use as safety valve, in the event that the pressure in container 1010 exceeds a permissible maximum. In such a case, a portion of the medium can be discharged via this second opening 1014 in order to reduce the pressure prevailing in the container. An appropriate overpressure valve can be disposed at second opening 1014 for this purpose.

Figure 11:
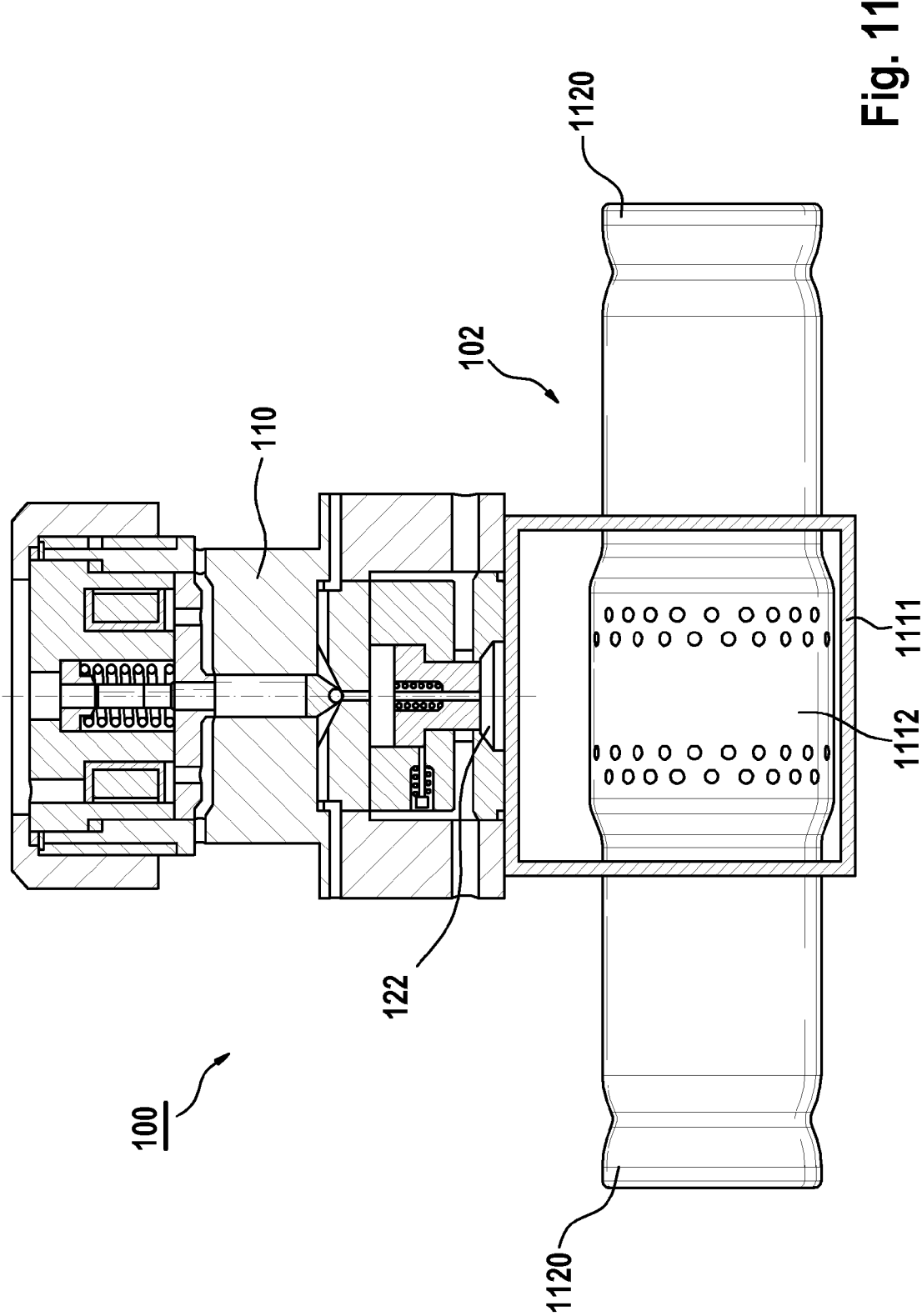
FIG. 11 shows a device for activating an impact protection device, which is situated transversely to the longitudinal extension of a medium storage, in the form of a multi-stage pyrotechnic gas generator, according to an example embodiment of the present invention.

FIG. 11 shows device 100 for activating an impact protection device according to one example embodiment of the present invention in which control device 110 is situated, as discussed with respect to FIG. 10, transversely to the longitudinal extension of a medium storage 102. Medium storage 102 in this example embodiment is a multi-stage pyrotechnic gas generator and includes, in the center of its longitudinal extension, outlet openings 1112, which communicate with medium inlet opening 122 of control device 110. This is schematically indicated by box 1111 around outlet openings 1112 of medium storage 102. The ends of squibs 1120 of the first and second stage are shown at the two outer ends of the longitudinal extension of medium storage 102.

Figure 12:
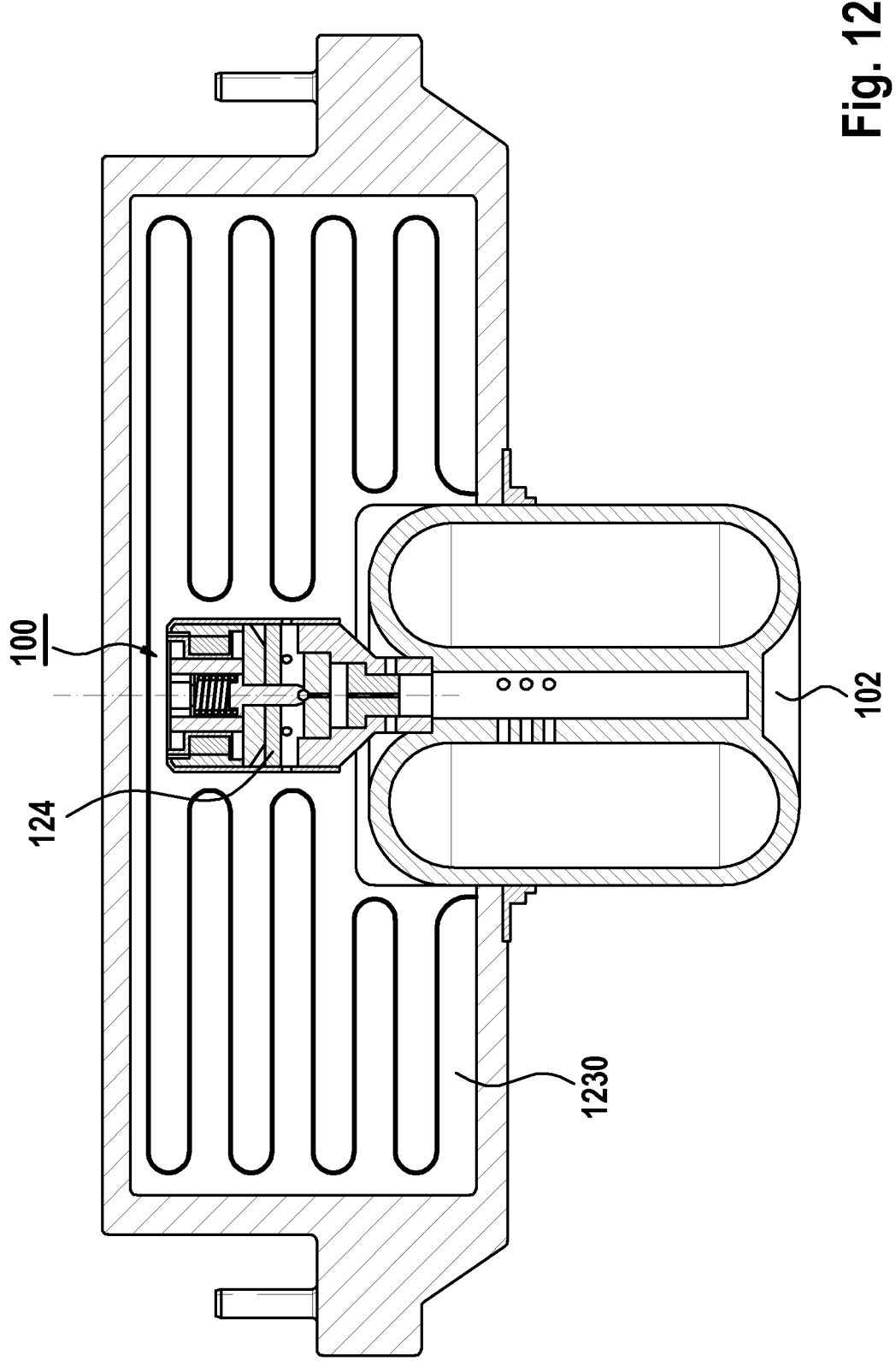
FIG. 12 shows a system that includes a medium storage, an impact protection device, and a device for activating an impact protection device, where a control device extends into the impact protection device, the latter of which is in the form of a folded-up airbag, according to an example embodiment of the present invention.

FIG. 12 shows a system that includes device 100 for activating an impact protection device according to one example embodiment of the present invention, control device 110, the impact protection device in the form of a folded-up airbag 1230, as well as a medium storage 102. Depending on the embodiment variant, medium storage 102 can be a pyrotechnic gas generator, a hybrid gas generator, or a cold gas generator. According to this example embodiment, control device 110 is disposed concentrically with medium storage 102. In addition, the at least one outlet opening 124 of control device 110 reaches into impact protection device 1230.

The example embodiments described and shown in the figures have only been selected as examples. Different exemplary embodiments may be combined with each other in their entirety or with regard to their individual features. Also, one example embodiment can be supplemented with features of another example embodiment. Furthermore, method steps can be repeated and carried out in a sequence different from the one described.

What is claimed is:

1. A device for controlling a volume flow of a medium for activating an impact protection device, the device comprising:
   a valve body including (a) a chamber in the valve body, (b) a medium inlet opening, at a first end of the chamber, from the chamber to a medium storage, (c) a control valve opening, at a second end of the chamber, and (d) a first outlet opening, between the first end and second ends, for discharging the medium into the impact protection device;
   a control valve for opening and closing the control valve opening for a passage of the medium; and
   a control piston including therein, and along a main extension axis thereof, a passage opening from a first active surface of the control piston to a second active surface of the control piston, wherein:
      the first active surface is adjacent to the medium inlet opening;
      the second active surface is adjacent to the control valve opening and is larger than the first active surface; and
      the control piston is movable in the chamber, with the aid of the medium and as a function of a position of the control valve, between an initial position, in which the first outlet opening is closed by the control piston, and an activation position, in which the first outlet opening is opened by the control piston.

2. The device of claim 1, wherein the medium is generated by a pyrotechnic gas generator.

3. The device of claim 1, wherein the medium is stored partially under pressure, and the medium inlet opening is closed by a bursting element.

4. The device of claim 1, wherein the medium is stored under pressure, and the medium inlet opening is closed by a bursting element.

5. The device of claim 1, wherein the control valve is currentlessly closed for closing the control valve opening from passage of the medium, the device further comprising an elastic component for keeping the control valve in a closed position.

6. The device of claim 1, wherein the control valve is currentlessly opened for opening the control valve opening for passage of the medium, the device further comprising an elastic component for keeping the control valve in an opened position.

7. The device of claim 1, wherein the valve body includes a second outlet opening for discharging the medium from the control valve into the impact protection device.

8. The device of claim 1, wherein the control piston is designed to cover the first outlet opening only partially in the initial position.

9. The device of claim 1, wherein the valve body includes, between the first outlet opening and the control valve opening, an acceleration opening for discharging the medium into the impact protection device, the acceleration opening being open when the control piston is in the initial position of the control piston and being closed when the control piston is in the activation position.

10. The device of claim 1, wherein the control valve includes a ball and a valve needle, the valve needle including a calotte for accommodating the ball at an end facing the control valve opening, a section of the valve body surrounding the control valve opening being formed as a valve seat for the valve needle.

11. The device of claim 1, further comprising a clamping sleeve and a clamping nut designed to axially brace, and radially guide, the valve body and the control valve, wherein the valve needle of the control valve is guidable in at least one of the clamping sleeve and the clamping nut.

12. The device of claim 1, further comprising a lift adjusting device configured for axially adjusting a valve lift of the control valve.

13. A device comprising:
a medium storage for storing a medium; and
a control device for controlling a volume flow of the medium from the medium storage, for activating an impact protection device, the control device including:
a valve body including (a) a chamber in the valve body, (b) a medium inlet opening, at a first end of the chamber, from the chamber to a medium storage, (c) a control valve opening, at a second end of the chamber, and (d) a first outlet opening, between the first end and second ends, for discharging the medium into the impact protection device;
a control valve for opening and closing the control valve opening for a passage of the medium; and
a control piston including therein, and along a main extension axis thereof, a passage opening from a first active surface of the control piston to a second active surface of the control piston;
wherein:
the first active surface is adjacent to the medium inlet opening;
the second active surface is adjacent to the control valve opening and is larger than the first active surface; and
the control piston is movable in the chamber, with the aid of the medium and as a function of a position of the control valve, between an initial position, in which the first outlet opening is closed by the control piston, and an activation position, in which the first outlet opening is opened by the control piston.

14. The device of claim 13, wherein the medium storage is configured for storing the medium at least partially under pressure, and the device further comprises a bursting element that closes the medium inlet opening of the valve body.

15. The device of claim 13, wherein the control device is situated transversely to the longitudinal extension of the medium storage.

16. The device of claim 13, wherein the control device is disposed concentrically with the medium storage.

17. The device of claim 13, wherein the medium storage includes outlet openings, and the control device is situated in such a way that the medium inlet opening communicates with the outlet openings of the medium storage.

18. A system comprising:
an impact protection device;
a medium storage for storing a medium; and
a control device for controlling a volume flow of the medium from the medium storage, for activating the impact protection device, the control device including:
a valve body including (a) a chamber in the valve body, (b) a medium inlet opening, at a first end of the chamber, from the chamber to a medium storage, (c) a control valve opening, at a second end of the chamber, and (d) a first outlet opening, between the first end and second ends, for discharging the medium into the impact protection device;
a control valve for opening and closing the control valve opening for a passage of the medium; and
a control piston including therein, and along a main extension axis thereof, a passage opening from a first active surface of the control piston to a second active surface of the control piston;
wherein:
the first active surface is adjacent to the medium inlet opening;
the second active surface is adjacent to the control valve opening and is larger than the first active surface;
the control piston is movable in the chamber, with the aid of the medium and as a function of a position of the control valve, between an initial position, in which the first outlet opening is closed by the control piston, and an activation position, in which the first outlet opening is opened by the control piston; and
the first outlet opening is in the impact protection device.

19. A method using a control device for controlling a volume flow of a stored medium for activating an impact protection device, the control device comprising (I) a valve body including (a) a chamber in the valve body, (b) a medium inlet opening, at a first end of the chamber, from the chamber to a medium storage, (c) a control valve opening, at a second end of the chamber, and (d) a first outlet opening, between the first end and second ends, for discharging the medium into the impact protection device, (II) a control valve for opening and closing the control valve opening for a passage of the medium; and (III) a control piston including therein, and along a main extension axis thereof, a passage opening from a first active surface of the control piston to a second active surface of the control piston, wherein the first active surface is adjacent to the medium inlet opening, the second active surface is adjacent to the control valve opening and is larger than the first active surface, and the control piston is movable in the chamber, with the aid of the medium and as a function of a position of the control valve, between an initial position, in which the first outlet opening is closed by the control piston, and an activation position, in which the first outlet opening is opened by the control piston, the method comprising:
activating the control valve to open the control valve opening and move the control piston from the initial position into the activation position.

20. The method of claim 19, wherein the opening of the control valve opening occurs when a bursting element that initially closes the medium inlet opening is burst.

21. The method of claim 19, further comprising:
activating the control valve to close the control valve opening and move the control piston from the activation position into the initial position.

\* \* \* \* \*